United States Patent
Hui et al.

(10) Patent No.: US 10,218,619 B2
(45) Date of Patent: Feb. 26, 2019

(54) PROACTIVE BROADCAST CAPACITY ADJUSTMENT FOR FAST NETWORK JOINS

(71) Applicant: Cisco Technology, Inc., San Jose, CA (US)

(72) Inventors: Jonathan W. Hui, Belmont, CA (US); Jean-Philippe Vasseur, Saint Martin d'Uriage (FR); Wei Hong, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 692 days.

(21) Appl. No.: 14/576,491

(22) Filed: Dec. 19, 2014

(65) Prior Publication Data

US 2016/0134539 A1 May 12, 2016

Related U.S. Application Data

(60) Provisional application No. 62/076,812, filed on Nov. 7, 2014.

(51) Int. Cl.
*H04L 12/801* (2013.01)
*H04L 12/26* (2006.01)
(Continued)

(52) U.S. Cl.
CPC ............. *H04L 47/12* (2013.01); *H04L 12/18* (2013.01); *H04L 41/0816* (2013.01); *H04L 43/062* (2013.01); *H04L 43/08* (2013.01); *H04L 43/16* (2013.01); *H04L 65/1069* (2013.01); *H04L 43/0811* (2013.01); *H04L 43/0852* (2013.01); *H04L 43/0894* (2013.01);
(Continued)

(58) Field of Classification Search
CPC ...... H04W 24/00; H04W 52/46; H04L 43/50; H04L 43/0852; H04L 43/08; H04L 47/50; H04L 47/622; H04L 5/06; H04B 17/003
USPC ........................................................ 709/223
See application file for complete search history.

(56) References Cited

U.S. PATENT DOCUMENTS 6,317,436 B1  11/2001  Young et al.
8,059,620 B2  11/2011  Moon
(Continued)

OTHER PUBLICATIONS

Palattella et al. "Standardized Protocol Stack for the Internet of (important) Things", vol. 15, No. 3, Jul. 2013, http://ieeexplore.ieee.org/stamp/stamp.jsp?arnumber=6380493.*
Maria R. Palattella et al. "Standardized Protocol Stack for the Internet of (important) Things", vol. 15, No. 3, Jul. 2013, https://ieeexplore.ieee.org/stamp/stamp.jsp?arnumber=6380493&tag=1.*
Maria R. Palattella et al. "Standardized Protocol Stack for the Internet of (Important) Things", vol. 15, No. 3, Jul. 2013 "http://ipv6forum.com/iot/images/IEEEsurveytutorial.pdf" (Year: 2013).*
(Continued)

*Primary Examiner* — Larry D Donaghue
*Assistant Examiner* — Patrick F Ngankam
(74) *Attorney, Agent, or Firm* — Parker Ibrahim & Berg LLP; James M. Behmke; Stephen D. LeBarron

(57) ABSTRACT

In one embodiment, a device in a network identifies an upcoming network formation event. The device instructs one or more nodes in the network to use a network formation broadcast schedule during the event. The device determines that a degree of functionality in the network during the event exceeds a threshold amount. The device instructs the one or more nodes to use a normal broadcast schedule, in response to determining that the degree of functionality in the network during the event exceeds the threshold amount. Channels of the network formation broadcast schedule are active more frequently than channels of the normal broadcast schedule when in use.

26 Claims, 19 Drawing Sheets

(51) Int. Cl.
  *H04L 29/06* (2006.01)
  *H04L 12/18* (2006.01)
  *H04L 12/24* (2006.01)
  *H04W 8/00* (2009.01)
  *H04W 40/24* (2009.01)
  *H04W 84/20* (2009.01)

(52) U.S. Cl.
  CPC .......... *H04W 8/005* (2013.01); *H04W 40/246* (2013.01); *H04W 84/20* (2013.01); *Y04S 40/162* (2013.01); *Y04S 40/168* (2013.01)

(56) References Cited

U.S. PATENT DOCUMENTS

| | | | |
|---|---|---|---|
| 8,908,621 B2 | 12/2014 | Vasseur et al. | |
| 9,020,008 B2 | 4/2015 | Hui et al. | |
| 9,081,567 B1* | 7/2015 | Mahamuni | G06F 1/3206 |
| 2010/0214995 A1* | 8/2010 | Iyer | H04W 48/12 |
| | | | 370/329 |
| 2013/0022084 A1 | 1/2013 | Vasseur et al. | |
| 2013/0028295 A1* | 1/2013 | Hui | H04B 1/713 |
| | | | 375/135 |
| 2014/0223155 A1* | 8/2014 | Vasseur | G06F 9/4405 |
| | | | 713/2 |

OTHER PUBLICATIONS

Gnawali et al., "The Minimum Rank with Hysteresis Objective Function", Request for Comments 6719, Sep. 2012, 13 pages, Internet Engineering Task Force Trust.
Thubert P., "Objective Function Zero for the Routing Protocol for Low-Power and Lossy Networks (RPL)", Request for Comments 6552, Mar. 2012, 14 pages, Internet Engineering Task Force Trust.
Vasseur et al., "Routing Metrics Used for Path Calculation in Low-Power and Lossy Networks", Request for Comments 6551, Mar. 2012, 30 pages, Internet Engineering Task Force Trust.
Vilajosana et al., "Minimal 6TiSCH Configuration", 6TiSCH Internet-Draft, <draft-ietf-6tisch-minimal-04>, Nov. 28, 2014, 21 pages, Internet Engineering Task Force Trust.
Winter et al., "RPL: IPv6 Routing Protocol for Low-Power and Lossy Networks", Request for Comments 6550, Mar. 2012, 157 pages, Internet Engineering Task Force Trust.
"[6tisch] Control bits in EB", http://www.ietf.org/mail-archive/web/6tisch/current/msg02228.html, May 20, 2014, 5 pages.
International Search Report and Written Opinion dated Feb. 12, 2016 in connection with PCT/US2015/058975.
Palatttella, et al: "Standardized Protocol Stack for the Internet of (Important) Things", IEEE Communications Surveys and Tutorials, Institute of Electrical and Electronics Engineers, US, vol. 15, No. 3, Jul. 1, 2013, pp. 1389-1406.

* cited by examiner

PROACTIVE BROADCAST CAPACITY ADJUSTMENT FOR FAST NETWORK JOINS

RELATED APPLICATIONS

This application claims priority to U.S. Provisional Application No. 62/076,812, filed Nov. 7, 2014, entitled: "PROACTIVE BROADCAST CAPACITY ADJUSTMENT FOR FAST NETWORK JOINS," by Hui et al., the contents of which are herein incorporated by reference.

TECHNICAL FIELD

The present disclosure relates generally to computer networks, and, more particularly, to proactively adjusting the broadcast capacity used for fast network joins.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

In contrast to many traditional computer networks, LLN devices typically communicate via shared-media links. For example, LLN devices that communicate wirelessly may communicate using overlapping wireless channels (e.g., frequencies). In other cases, LLN devices may communicate with one another using shared power line communication (PLC) links. For example, in a Smart Grid deployment, an electric utility may distribute power to various physical locations. At each location may be a smart meter that communicates wirelessly and/or using the electrical power distribution line itself as a communication medium.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
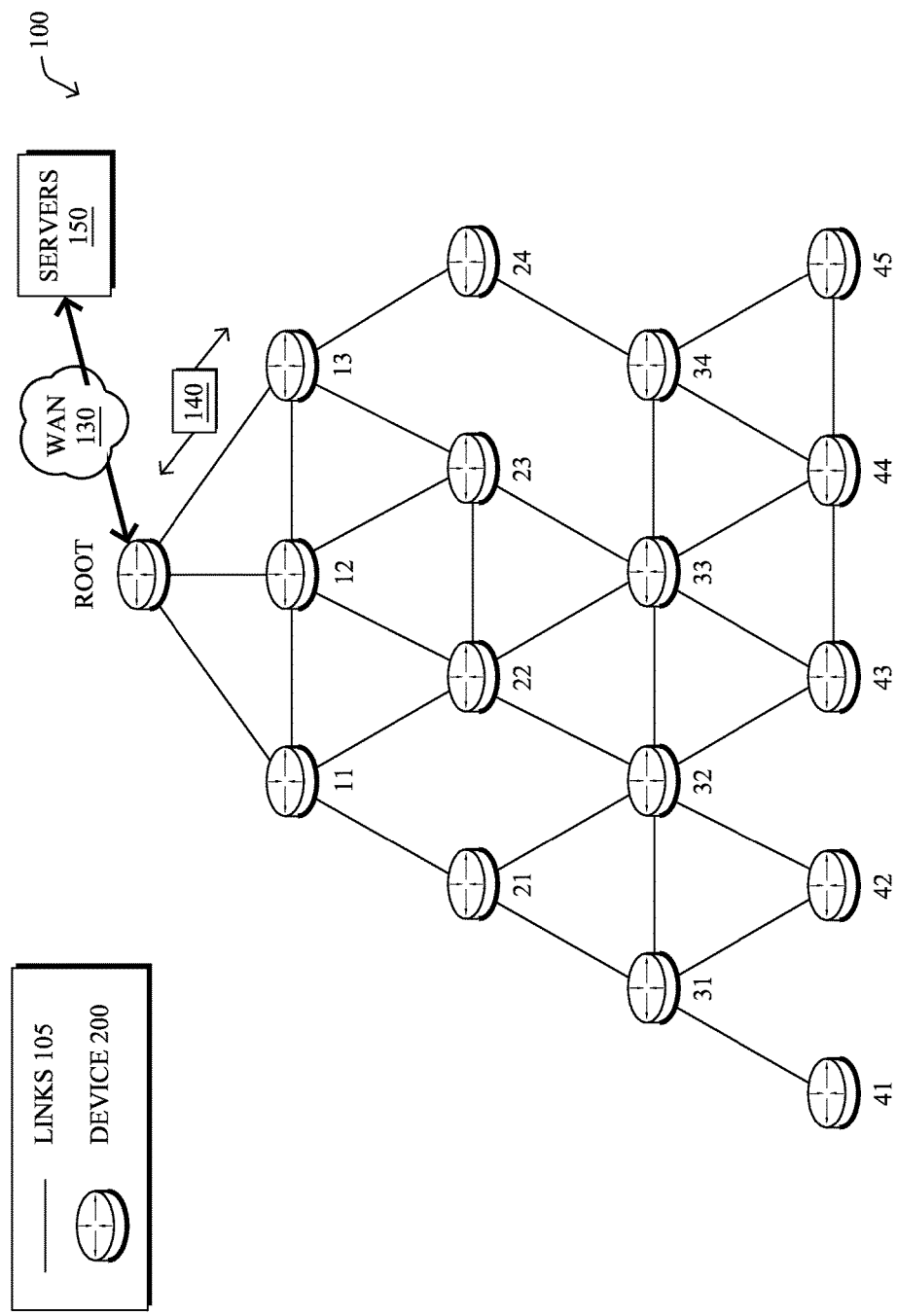
FIG. 1 illustrates an example communication network.

According to one or more embodiments of the disclosure, a device in a network identifies an upcoming network formation event. The device instructs one or more nodes in the network to use a network formation broadcast schedule during the event. The device determines that a degree of functionality in the network during the event exceeds a threshold amount. The device instructs the one or more nodes to use a normal broadcast schedule, in response to determining that the degree of functionality in the network during the event exceeds the threshold amount. Channels of the network formation broadcast schedule are active more frequently than channels of the normal broadcast schedule, when in use.

In further embodiments, a device detects a network formation event. The device uses a network formation broadcast schedule during the network formation event. The device receives an instruction to switch to a normal broadcast schedule. The device uses the normal broadcast schedule, in response to receiving the instruction. Channels of the network formation broadcast schedule are active more frequently than channels of the normal broadcast schedule, when in use.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE 1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. The illustrative root node, such as a field area router (FAR), may interconnect the local networks with a WAN 130, which may enable communication with other relevant devices such as management devices or servers 150, e.g., a network management server (NMS), a dynamic host configuration protocol (DHCP) server, a constrained application protocol (CoAP) server, an outage management system (OMS), etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
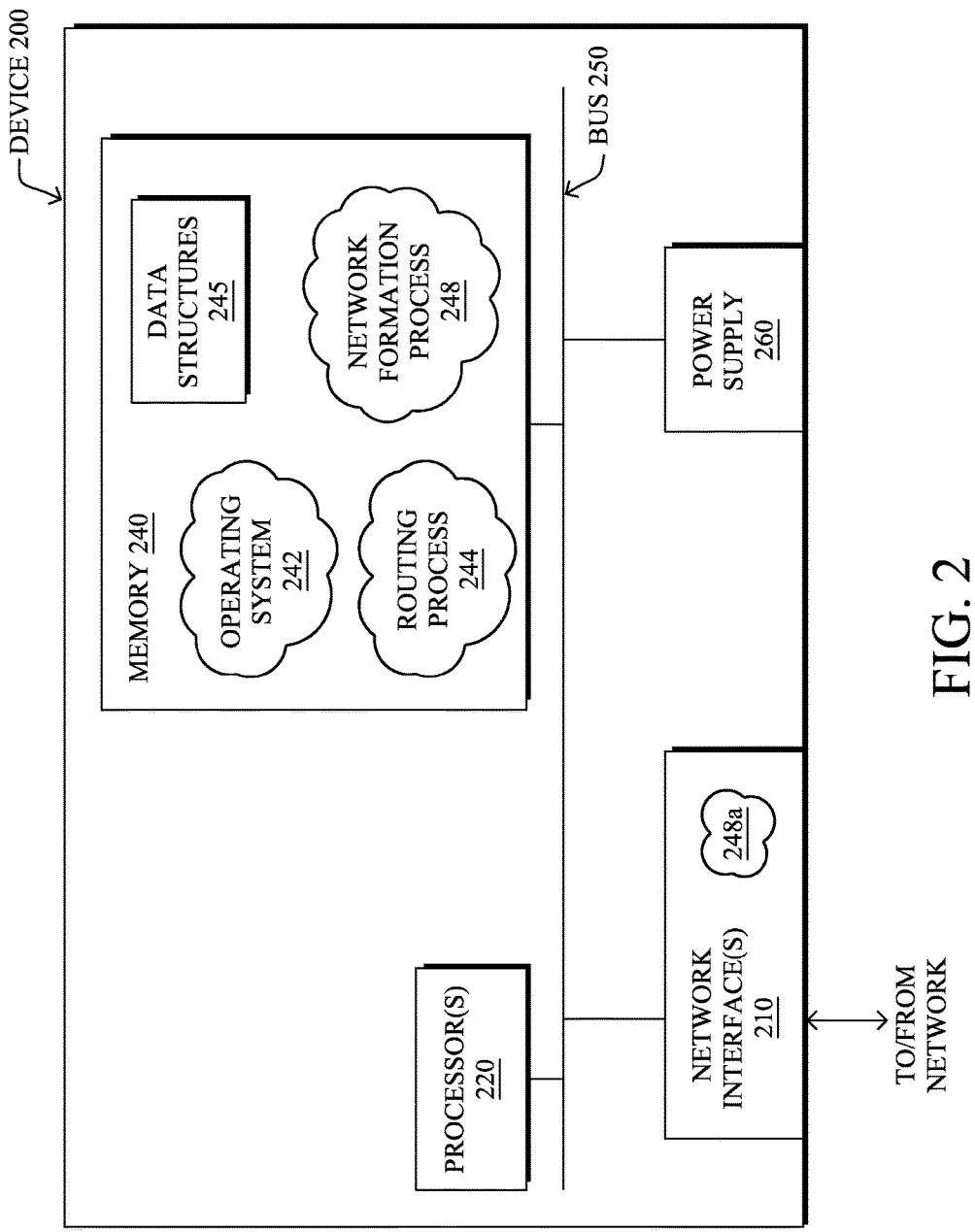
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 and an illustrative network formation process 248, as described herein. Note that while process 248 is shown in centralized memory 240, alternative embodiments provide for the process to be specifically operated within the network interfaces 210, such as a component of a MAC layer (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are included in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks"<RFC 6551> by Vasseur, et al. (March 2012 version). Further, an example OF (e.g., a default OF) may be found in an IETF RFC, entitled "RPL Objective Function 0"<RFC 6552> by Thubert (March 2012 version) and "The Minimum Rank Objective Function with Hysteresis"<RFC 6719> by O. Gnawali et al. (September 2012 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
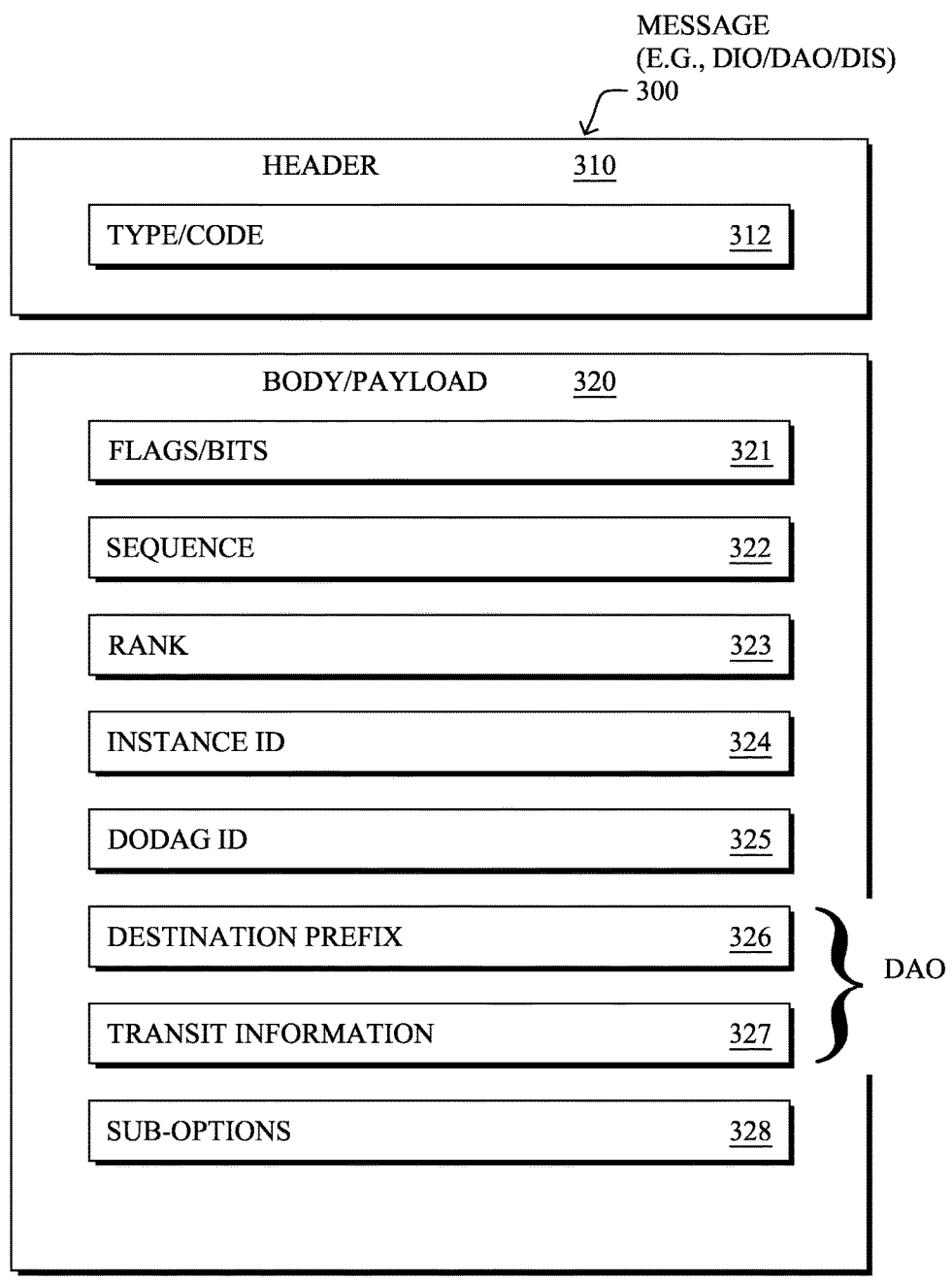
FIG. 3 illustrates an example routing protocol message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
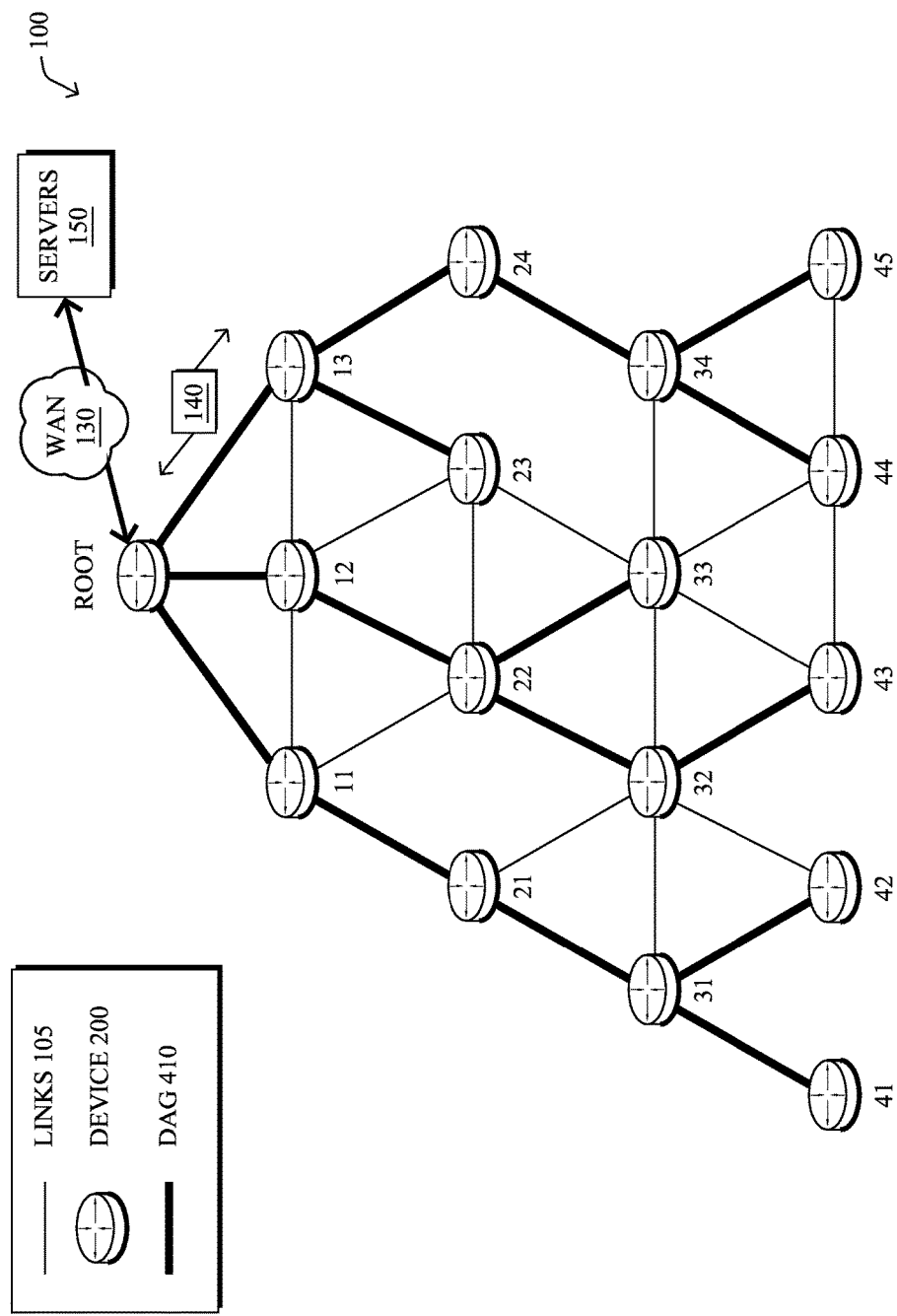
FIG. 4 illustrates an example directed acyclic graph (DAG) in the network.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

Moreover, in many cases, LLN devices communicate using a frequency-hopping, or channel-hopping, link layer (the terms "frequency" and "channel" may be used interchangeably herein). This approach may be driven both by regulatory compliance and the fact that channel-hopping systems offer better spectral efficiency. Frequency-hopping, also referred to as "frequency-hopping spread spectrum" (FHSS), is a method of transmitting radio signals by rapidly switching a carrier among numerous frequency channels, e.g., using a pseudorandom sequence known to both transmitter and receiver. For example, frequency-hopping may be utilized as a multiple access method in the frequency-hopping code division multiple access (FH-CDMA) scheme. Generally, as may be appreciated by those skilled in the art, transmission using frequency-hopping is different from a fixed-frequency transmission in that frequency-hopped transmissions are resistant to interference and are difficult to intercept. Accordingly, frequency-hopping transmission is a useful technique for many applications, such as sensor networks, LLNs, military applications, etc.

Figure 5:
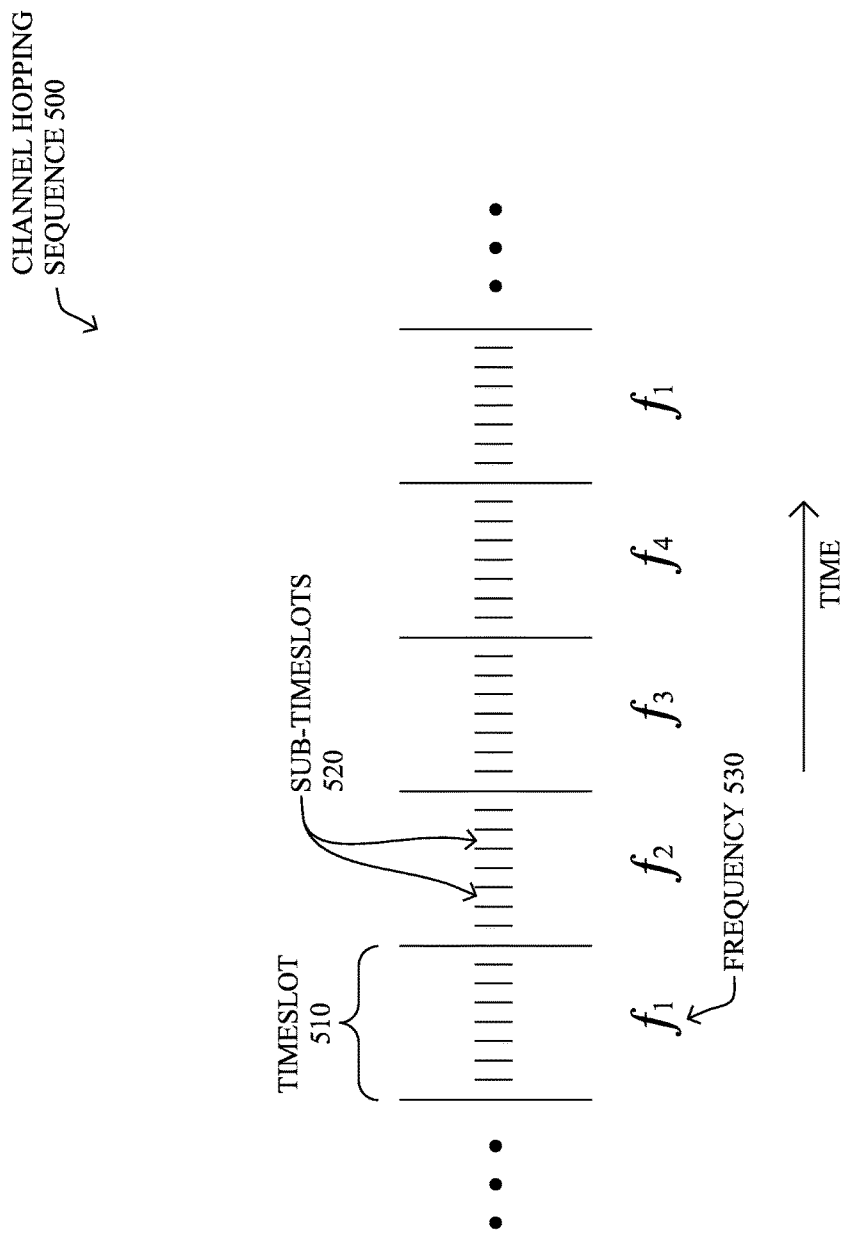
FIG. 5 illustrates an example channel-hopping sequence.

In general, as shown in FIG. 5, in frequency-hopping wireless networks, time frames are divided within a frequency-hopping sequence 500 into regular timeslots 510, each one operating on a different frequency 530 (e.g., $f_1$-$f_4$). A reference clock may be provided for the time frames for an entire network (e.g., mesh/cell), or at least between pairs of communicating devices. A MAC layer (of network interface 210) of each node 200 divides time into timeslots that are aligned with the timeslot boundary of its neighbor. Also, each timeslot 510 may be further divided into sub-timeslots 520. (Note that not all frequency-hopping systems use sub-timeslots, and devices can begin transmission at any time within a timeslot; the view herein is merely one example.) Illustratively, the MAC layer is in charge of scheduling the timeslot in which a packet is sent, the main objective of which generally being randomization of the transmission time in order to avoid collisions with neighbors' packets. Note that the MAC layer must not only schedule the data messages coming from upper layers of a protocol stack, but it also must schedule its own packets (e.g., acknowledgements, requests, beacons, etc.).

A device in the frequency-hopping network configures its receiver to follow a hopping schedule by picking a channel/frequency sequence, duration of each timeslot, and time base that defines when the first slot in the schedule begins. To then communicate a packet, the transmitter and receiver must be configured to the same channel/frequency during the packet transmission, i.e., synchronized. All devices in a given network may utilize the same hopping schedule (i.e., all devices are configured to use the same channel sequence, time slot duration, and a common time base), resulting in a network where all communication in the network at any given point in time utilizes the same channel. Alternatively, each transmitter-receiver pair may utilize different hopping schedules (i.e., each pair may differ in channel sequence, time slot duration, and/or time base), such that transmitter-receiver pairs may communicate at the same time but on different channels. Moreover, timeslots between different devices can, in fact, be out-of-phase, and may have no relationship with each other. The latter approach may be preferable, at times, as it can add to the overall robustness and versatility of the communication network.

Figure 6:
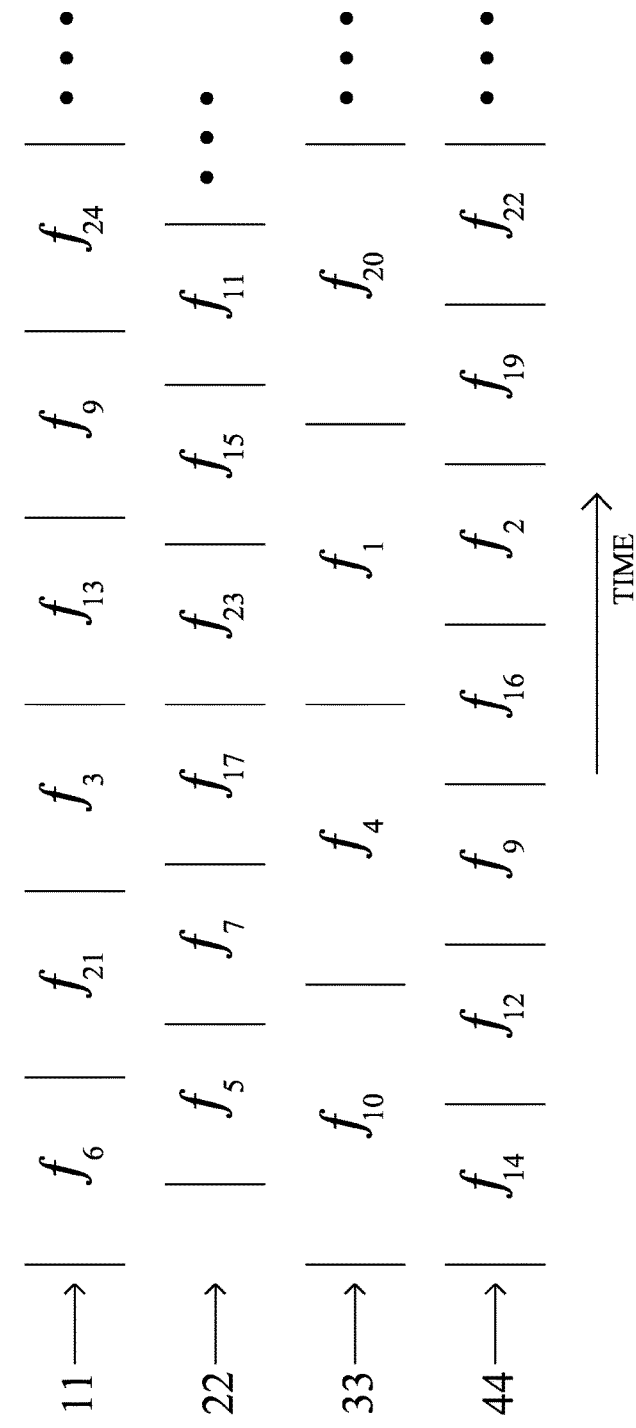
FIG. 6 illustrates example independently determined and independently timed channel-hopping sequences.

FIG. 6 illustrates an example of independently determined local unicast listening schedules 600 that may be independently computed by each individual device, "11," "22," "33," and "34," respectively. A device synchronizes its listening, or "hopping," schedule with another device by communicating its channel sequence, time slot duration, and current time within the schedule. Hopping schedule parameters may be communicated in explicit synchronization packets and/or piggybacked on existing data packets. As mentioned, some of these parameters (e.g., channel sequence) may be network-wide and implicit. Devices store these parameters to know what channel to use for transmission at a particular time. However, it is possible that devices may not know the addresses of neighboring devices. Therefore, link-layer broadcast communication may be necessary, as it does not require any synchronization to communicate with neighboring devices. For example, IEEE 802.15.4 Enhanced Beacon Requests (EBRs) and Enhanced Beacons (EBs) are used by devices to discover neighboring networks. This type of broadcast communication is considered "asynchronous," since the network devices are not synchronized to a common channel schedule.

Figure 7A:
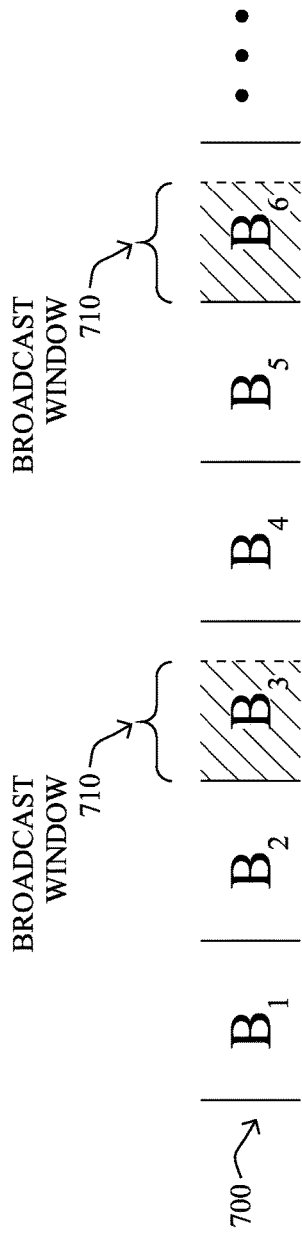
FIGS. 7A-7B illustrate example broadcast schedule overlays.
Figure 7B:
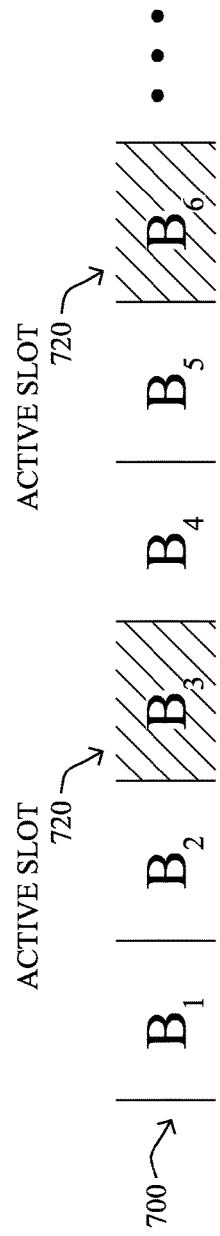

FIGS. 7A-7B illustrates an example broadcast schedule (sequence) 700, showing example frequencies $B_1$-$B_6$. Typically, all nodes in the network synchronize to only one broadcast schedule. The slot timing of broadcast slots in the common broadcast schedule may generally be independent of slot timing of unicast slots in the local unicast listening schedule. Note that while the broadcast schedule 700 is shown with a frequency or channel designated in each timeslot (from which particular portions are selected for use), the techniques herein may also simply populate the schedule with those broadcast slots that are to be used (e.g., only $B_3$ and $B_6$, as shown below). The broadcast schedule may be established by a single root node and distributed to all other nodes using any standard dissemination protocol (e.g., simple flood, Trickle-based dissemination, etc.). Note that the dissemination protocol may utilize unsynchronized transmissions, particularly where no schedule has yet been established. The root node may be administratively assigned (e.g., by an IEEE 802.15.4 PAN coordinator, Field Area Router, etc.) or automatically discovered.

A broadcast schedule may be defined by the following parameters:

1.) Broadcast Window: specifies how long a node listens for broadcast messages within a broadcast slot. FIG. 7A illustrates an example of broadcast windows 710, during which the common broadcast schedule is to be used (a configured portion overlaying the unicast schedules). Broadcast windows may be found in only specific timeslots as shown, or else may be the initial portion (e.g., one or more sub-timeslots) of every timeslot of the sequence. Broadcast packets must start their transmission within the Broadcast Window to ensure that all neighboring nodes are listening for the broadcast transmission. The Broadcast Window must specify a time that is no greater than the Slot Duration. At the beginning of each designated broadcast slot, the node switches to the next channel in the broadcast schedule to listen for broadcast transmissions. At the end of the Broadcast Window, the node returns to listening for unicast transmissions until the start of the next broadcast slot. The unicast schedule is free running and the timing remains unaffected by the broadcast schedule. In other words, the broadcast schedule is overlaid on a node's unicast schedule. Note that in one embodiment, the Broadcast Window may utilize one or more sub-timeslots starting at different offsets within each broadcast slot. For example, the Broadcast Window may start on sub-slot X in slot 1, Y in slot 2, Z in slot 3, etc. The sub-slot start time may be specified as part of the broadcast channel sequence, where each slot indicates not only channel but sub-slot offset.

2.) Active Slot Period (instead of or in addition to a Broadcast Window): specifies which slots within a broadcast schedule are used to listen for broadcast transmissions. For example, an Active Slot Period of 10 would indicate that the node listens for broadcast communication every tenth slot of the broadcast schedule. During the other 9 out of 10 slots, the device follows its own unicast schedule and listens for unicast communication. FIG. 7B illustrates an example of an active slot period, e.g., of 3, where every third slot of the common broadcast schedule is a time during which the common broadcast schedule is to be used (e.g., corresponding to $B_3$ and $B_6$).

Notably, the configured portion of the common broadcast schedule that is used to overlap the unicast schedules, e.g., the Broadcast Window size and/or Active Slot Period, can be adjusted to configure the amount of time that a network spends listening for broadcast traffic rather than unicast traffic, as described in greater detail below.

According to the illustrative technique, the common broadcast schedule 700 overlays each individual device's unicast listening schedule 600, such that the devices operate in a receive mode (listening for transmissions) according to the local unicast listening schedule and the common broadcast schedule during the overlaid configured portion, and operate in a transmit mode according to each neighbor unicast listening schedule and the common broadcast schedule during the overlaid configured portion depending upon a destination of transmitted traffic.

Figure 8:
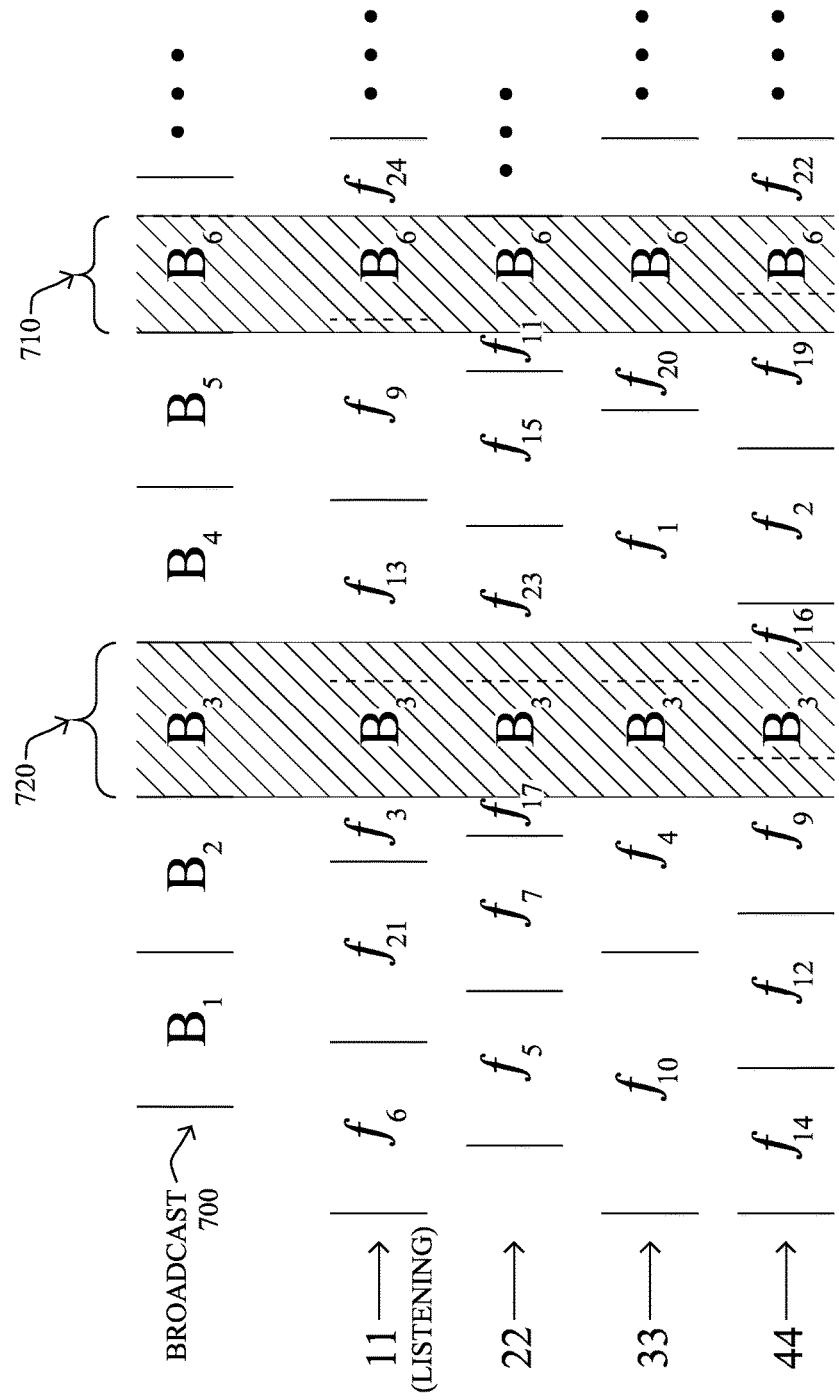
FIG. 8 illustrates an example of a broadcast schedule overlaid on independent unicast sequences.

For example, FIG. 8 illustrates the overlay of the broadcast schedule 700 over the unicast listening schedules 300 of each device in the network. For instance, as can be seen, node 11 listens to its local unicast listening schedule unless the particular overlaid portion of the broadcast schedule dictates that node 11 listen on the broadcast channel at the time. Should node 11 wish to send a transmission to any of its neighbor nodes (22-44), node 11 uses the neighbor's listening schedule according to whether a unicast message or broadcast message is to be used. Note that in FIG. 8, the left side shows an active broadcast slot period 720, while the right side shows a broadcast window 710, though this is merely for illustration. Note further that a combination of slot period 720 and broadcast window 710 may be used, e.g., defining which particular slots of a broadcast schedule to use (period 720), and then further defining a length of time for each of those slots to use (window 710).

In particular, unicast link frames are typically sent using the receiver's (neighbor's) unicast schedule. The link layer maintains a table for neighboring receivers that includes information about the receivers' schedules. If the intended receiver is not resident in the neighbor table, then the message is passed back to higher layers with an error condition. Otherwise, the transmitter determines the appropriate channel given the current time and begins transmission, i.e., transmitting a unicast message to a particular neighbor during a unicast slot based on the corresponding neighbor unicast listening schedule for the particular neighbor. While it may be possible to send unicast frames via the broadcast schedule, this is typically not done due to the loss of spectral efficiency.

Also, broadcast link frames are typically sent using the network's broadcast schedule. The link layer maintains information about the broadcast schedule. If the broadcast schedule is unknown, the message is passed back to higher layers with an error condition. Otherwise, the transmitter wait until the next broadcast window, selects the appropriate channel, and begins transmission at that time, i.e., transmitting a broadcast message into the network during a broadcast slot based on the common broadcast schedule. Typically, the broadcast schedule is only active under normal circumstances for a fraction of the time (e.g., 25%), allowing a tradeoff to be made between unicast and broadcast schedules. Notably, this hybrid approach allows the spectral efficiency of unicast communications to be maximized, while still supporting efficient broadcast communications throughout the network. Also of note is that while it is possible to broadcast frames outside of the broadcast schedule, the probability of a neighbor receiving such a transmission is greatly reduced, but may still be used in some situations (e.g., when device density is high, etc.).

An important network characteristic in many IoT networks (e.g., in Smart Grid AMI networks) is the network formation time. This is the time that it takes a set of nodes within a given geographic region to form a routing topology (e.g., a DAG, as described above). An important component of forming the routing topology is neighbor discovery. When combined with a channel-hopping link topology, neighbor discovery generally involves determining the presence of a neighboring device and its current location within the channel-hopping schedule. In other words, channel-hopping adds yet another dimension to the network formation cost, if each device has its own unique channel-hopping schedule.

As mentioned above, some mesh technologies implement a network-wide broadcast schedule that operates for some fraction of time X (e.g., less than 35% of the time). The fraction X represents a tradeoff. In particular, larger values of X increase the network's capacity for broadcast communication, but at the cost of the network's capacity for unicast communications. Similarly, smaller values of X increase the network's capacity for unicast communications, but at the expense of the network's capacity for broadcast communications.

During network formation, a key insight is that broadcast communication can make network formation more efficient. Notably, by having a network-wide broadcast schedule, a device can transmit a single message that is received by an arbitrary number of neighbors. Furthermore, because the broadcast schedule is common to all devices, a device need not determine the channel-hopping schedule of a particular neighbor before communicating with it.

Proactive Broadcast Capacity Adjustment for Fast Network Joins

The techniques herein provide a method for proactively adjusting the broadcast schedule configuration when network formation is to occur in the future. In one aspect, a new network formation state is introduced that increases the broadcast schedule capacity for network join operations. In another aspect, nodes may enter into the network formation state when there is indication that network formation is to occur in the near future. In a further aspect, nodes may provide feedback that indicates whether the broadcast schedule change should take place. In another aspect, nodes may leave the network formation state based on metrics that signify that fast network formation is no longer needed.

Illustratively, the techniques described herein may be performed by hardware, software, and/or firmware, such as in accordance with the network formation process 248/248a, which may contain computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various PLC protocols or wireless communication protocols, and as such, may be processed by similar components understood in the art that execute those protocols, accordingly.

Specifically, a device in a network identifies an upcoming network formation event. The device instructs one or more nodes in the network to use a network formation broadcast schedule during the event. The device determines that a degree of functionality in the network during the event exceeds a threshold amount. The device instructs the one or more nodes to use a normal broadcast schedule, in response to determining that the degree of functionality in the network during the event exceeds the threshold amount. Channels of the network formation broadcast schedule are active more frequently than channels of the normal broadcast schedule when in use.

Operationally, the techniques herein introduce a new "network formation state," where devices in that state increase their broadcast schedule capacity to better support network formation. In response to indications that network formation may happen in the near future, the network proactively enables the network formation state to prepare for the task of network formation. After some time, or in response to changing network metrics, the network may disable the network formation state optimized for normal network operation.

A first aspect of the techniques herein involves defining the new network formation state for the broadcast schedule that has an active percentage Y %>X %, where X % is the active percentage when not in the network formation state. Notably, when the broadcast schedule is active, all devices in the network listen to the channel identified by the common broadcast channel-hopping schedule. When the broadcast schedule is inactive, each device in the network listens to the channel identified by its own unique channel-hopping function. A typical deployment may set Y greater than 80% (e.g., up to 100%), although any percentage may be used in accordance with the techniques herein.

Figure 9:
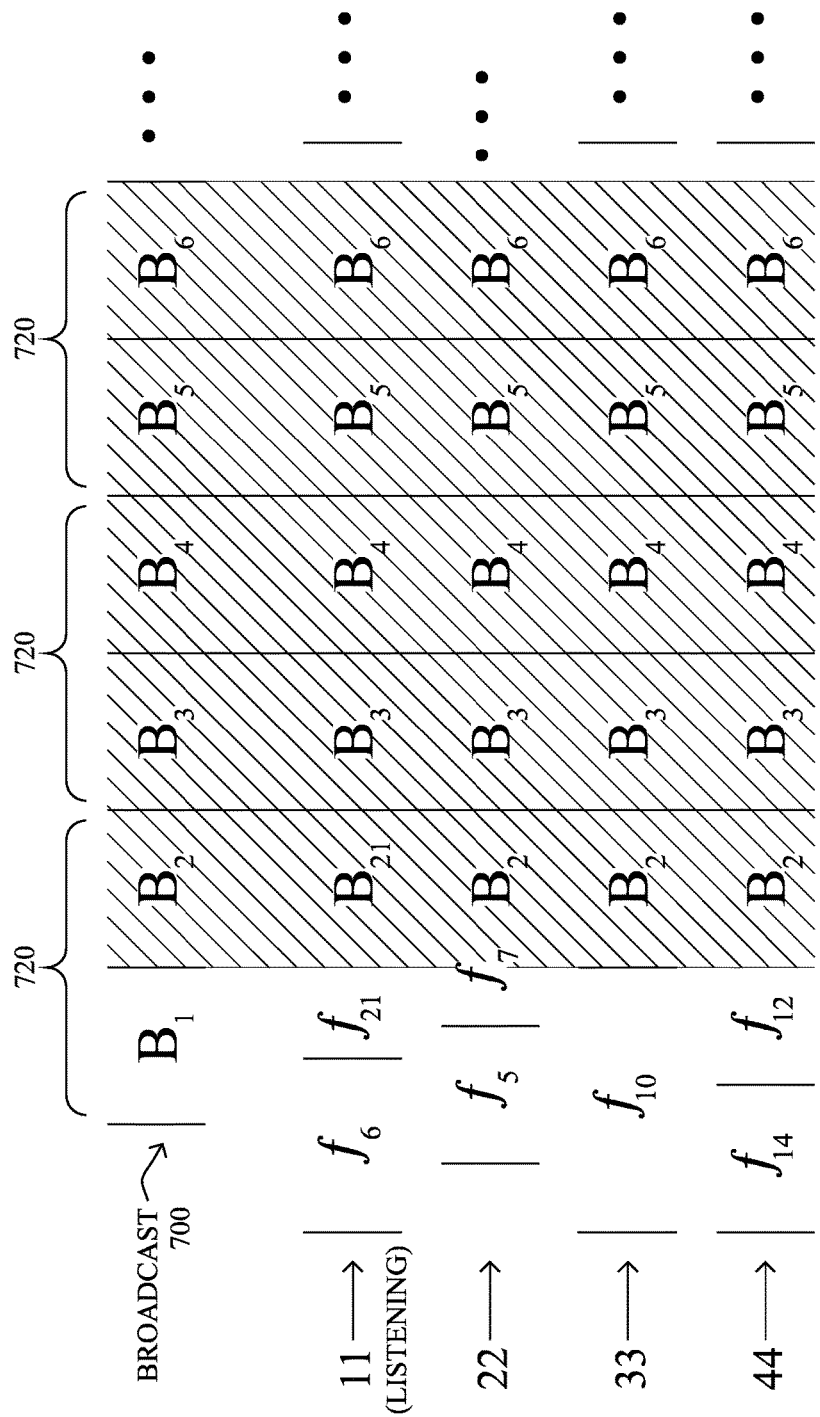
FIG. 9 illustrates an example of a network formation broadcast schedule overlaid on independent unicast sequences.

FIG. 9 illustrates an example of a network formation broadcast schedule overlaid on independent unicast sequences, according to some embodiments. As shown, slot periods 720 may be increased considerably over those shown in FIG. 8 such that the nodes in the network actively use the channels of broadcast schedule 700 most, if not all, of the time, when the network formation broadcast schedule is active. Accordingly, the nodes may not use their unicast schedules at all when the network formation broadcast schedule is active, in sharp contrast to when the normal broadcast schedule is active (e.g., as shown in the example of FIG. 8).

Figure 10A:
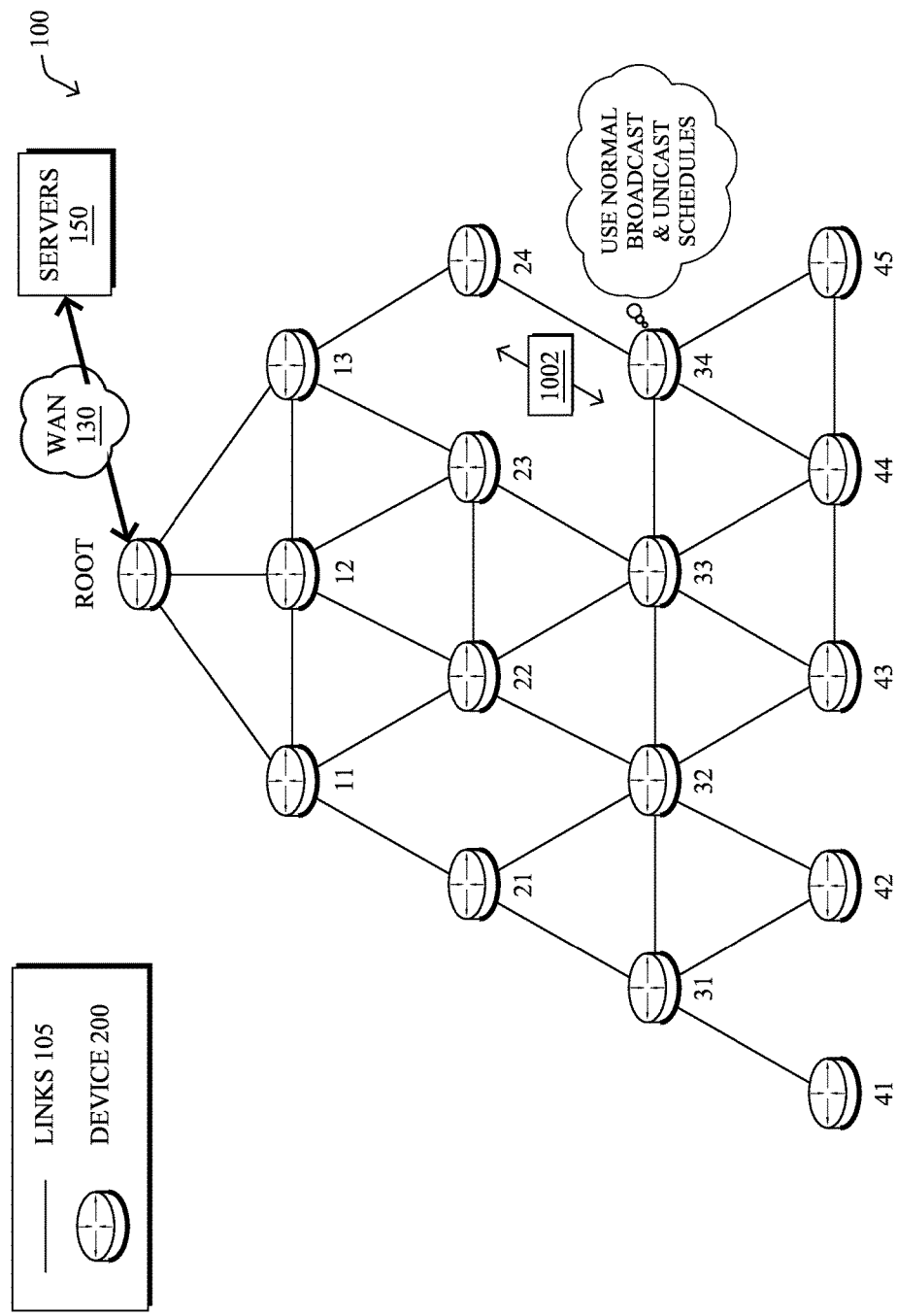
FIGS. 10A-10F illustrate an example of nodes switching between normal and network formation broadcast schedules.

A second aspect of the techniques herein involves enabling the network formation state proactively, an example of which is illustrated in FIGS. 10A-10F. As shown in FIG. 10A, a particular node in the network (e.g., node 34) may use its independently-determined channel hopping schedule and overlaid normal broadcast schedule for purposes of communicating data 1002 between itself and node 24. For example, node 34 may use the normal broadcast schedule depicted in FIG. 8, the channels of which are only active for a relatively small percentage of the time, to allow for the unicast channels of node 34 to be used to communicate data 1002.

Figure 10B:
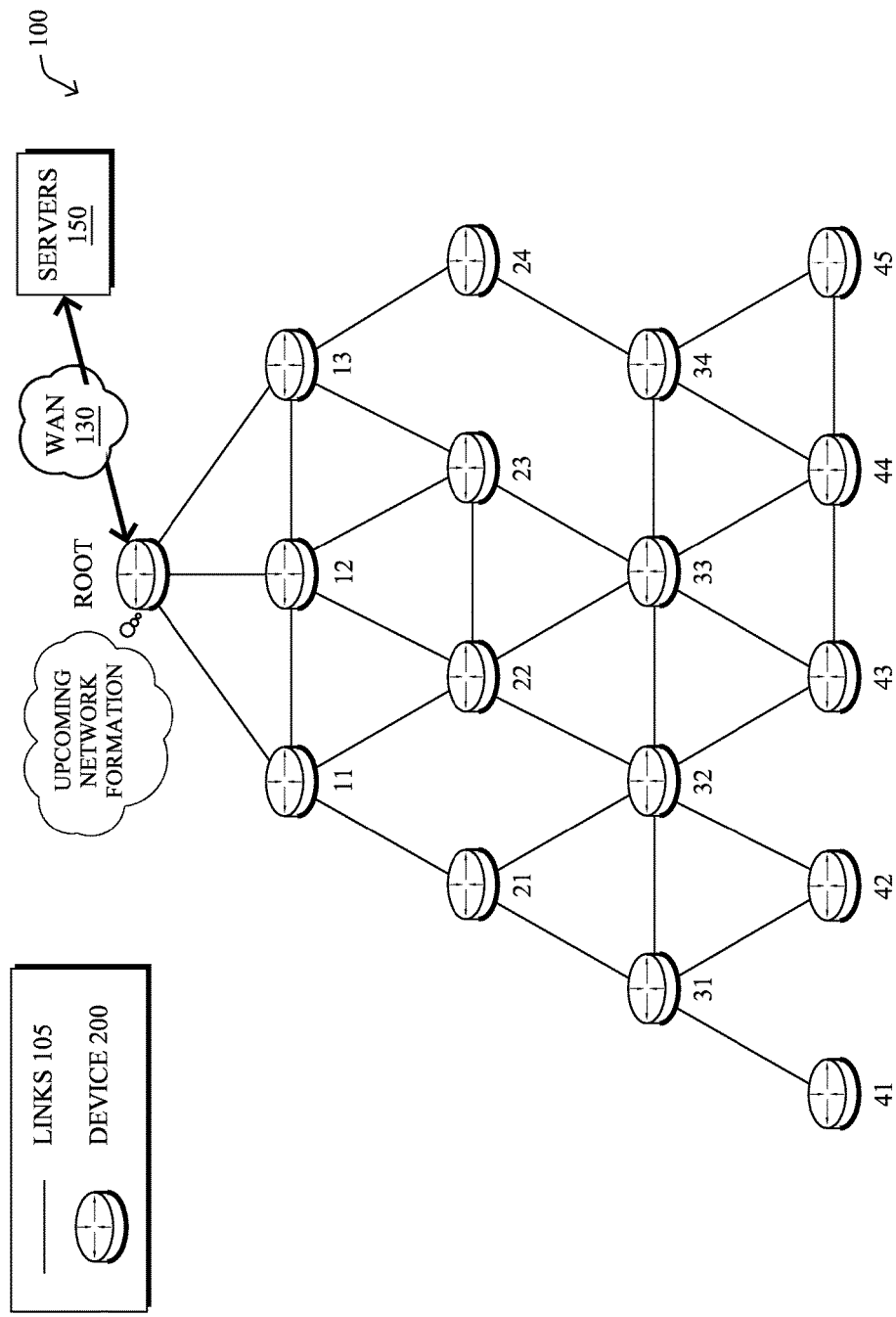
Figure 10C:
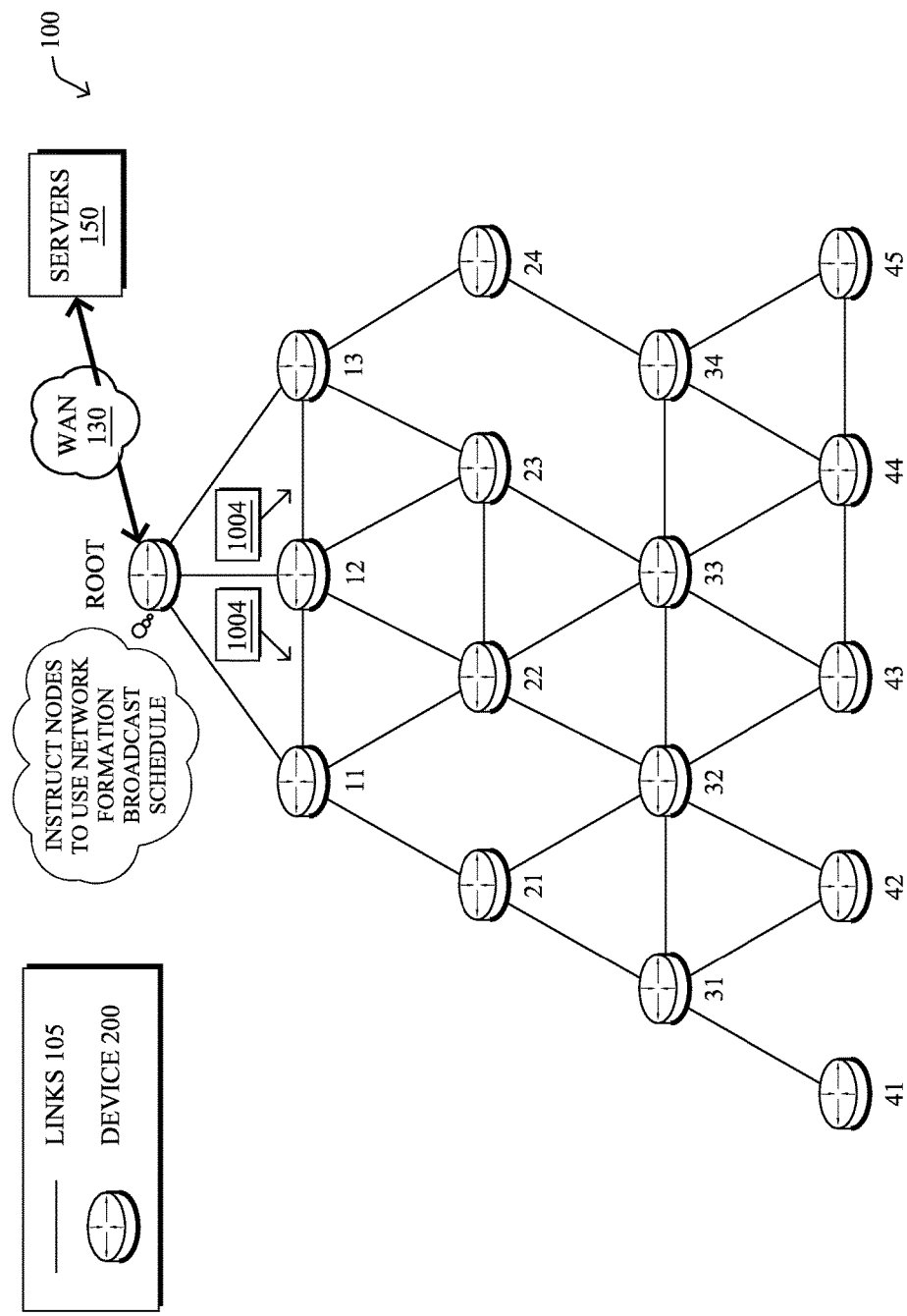

In FIG. 10B, a supervisory network device (e.g., a FAR/Root node, an NMS or OMS in servers 150, etc.) may determine that a network formation event is upcoming. In various embodiment, as shown in FIG. 10C, the supervisory device may then send instructions 1010 to one or more nodes in the network that cause the node(s) to use a network formation broadcast schedule during the network formation event. For example, the FAR/Root may instruct node 34 to use the network formation broadcast schedule depicted in FIG. 9 in which the broadcast channels are active most, if not all, of the time when in use. Alternatively, a node may be preconfigured to be in a network formation state as part of its commissioning before deployment (e.g., the device may be preconfigured to use a network formation broadcast schedule when joining a network).

A supervisory device may determine that a network formation event will occur in the future in a variety of ways. For example, when transitioning the LLN interface from the DOWN state to the UP state on the FAR/Root, the FAR may instruct the other nodes/devices to enter the network formation state. In another example, detected events such as the power outage event may trigger nodes to enter the network formation state, in anticipation of the power restoration event. In some embodiments, an NMS (e.g., one of servers 150) or other supervisory system (e.g., an OMS, etc.) may send a request to the FAR/Root to initiate a broadcast switchover among the nodes, if a network formation event is going to occur. In one embodiment, such a notification may be sent via a custom IPv6 CoAP message to the DAG Root, which then translates the request an 802.15.4 message that can be disseminated to the nodes (e.g., instruction 1004).

Figure 10D:
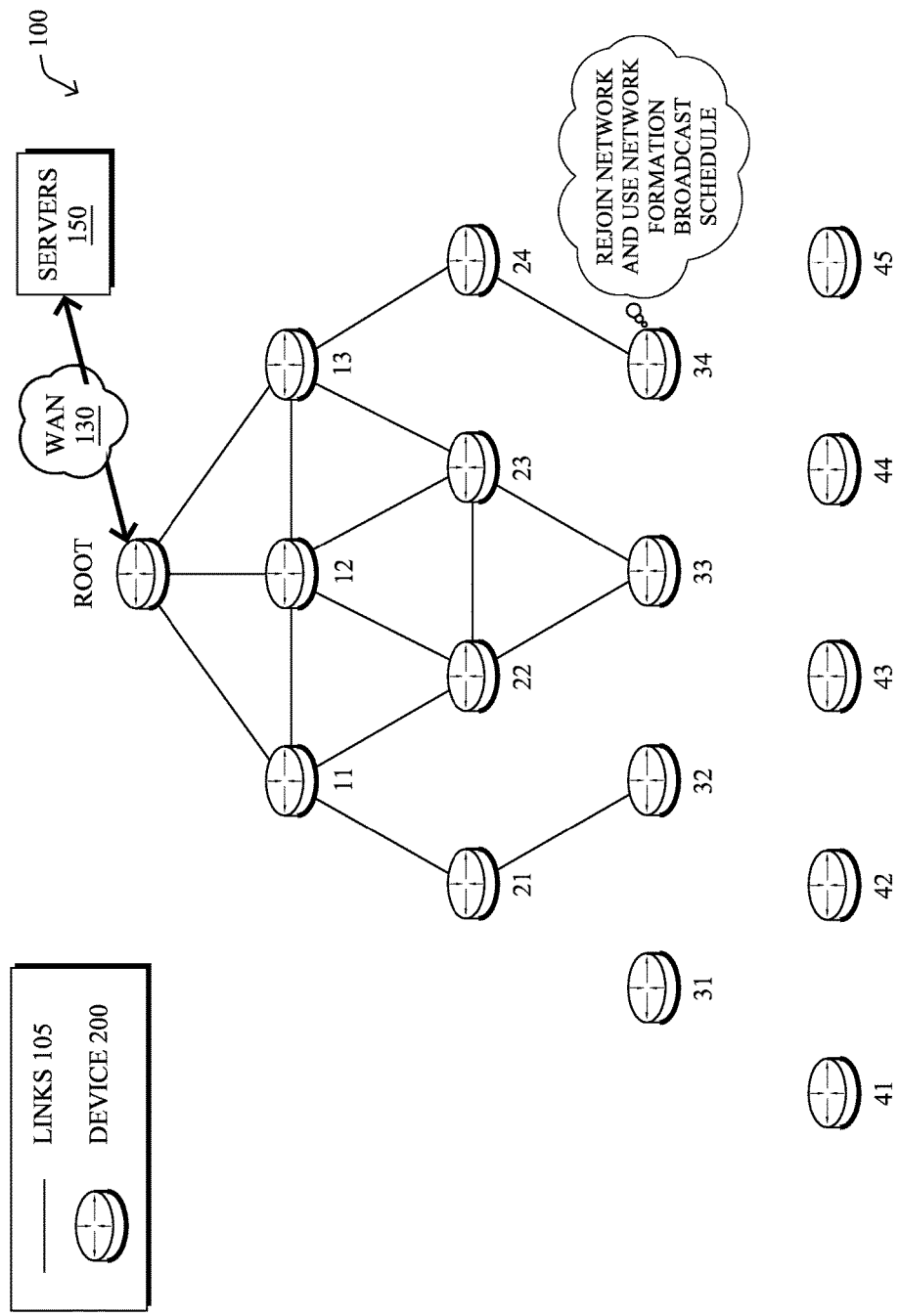

By placing nodes into a network formation state in which the broadcast schedule is active a large percentage of the time, the additional capacity allocated to the broadcast communications may speed up network formation. For example, as shown in FIG. 10D, node 34 may use the network formation broadcast schedule during the network formation event and until such a time at which it is instructed to do otherwise. In one embodiment, a node may be placed in the network formation state as part of commissioning before deployment. In other embodiments, the node may use the network formation broadcast schedule, in response to receiving an instruction to do so (e.g., instruction 1004).

Figure 10E:
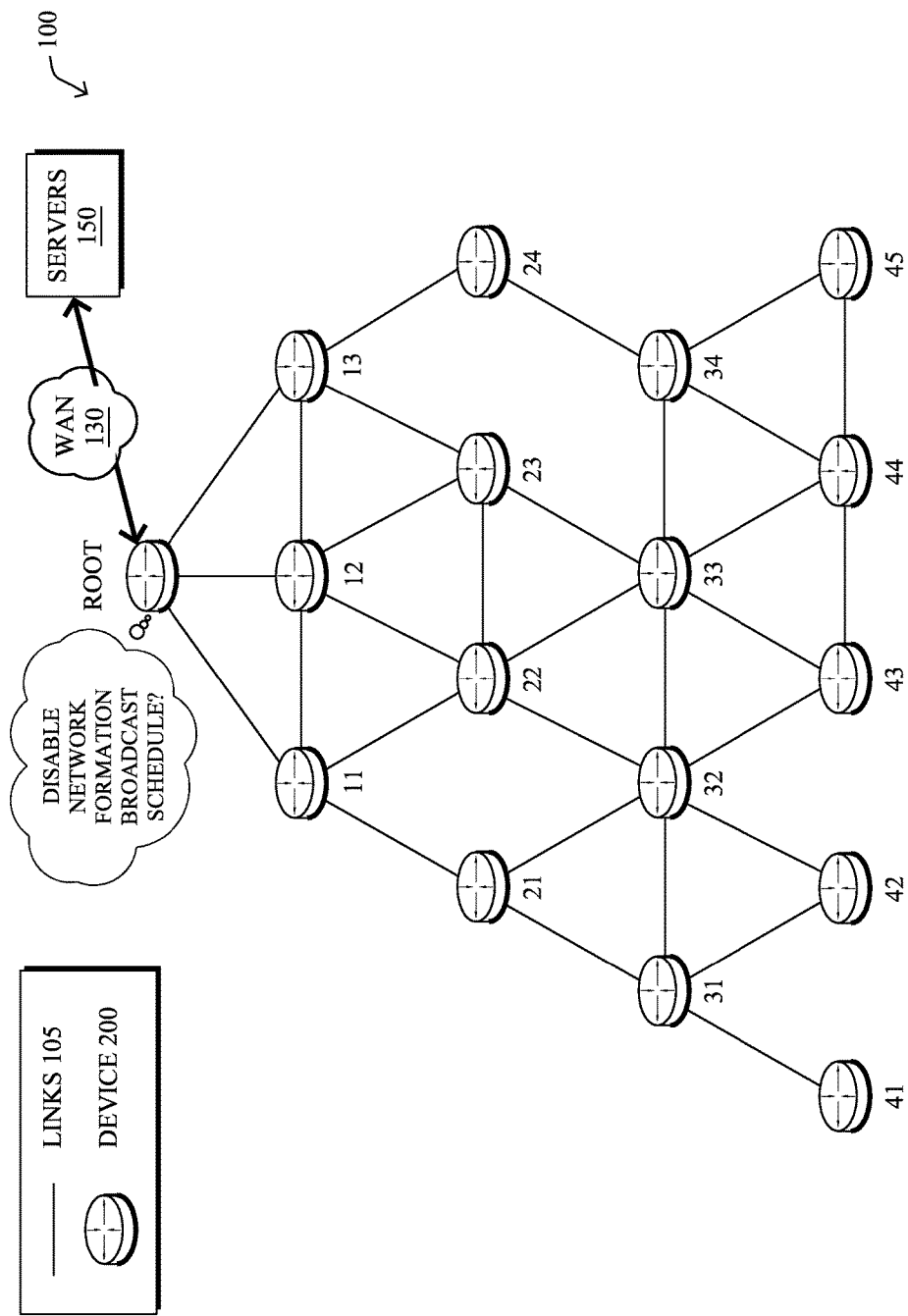
Figure 10F:
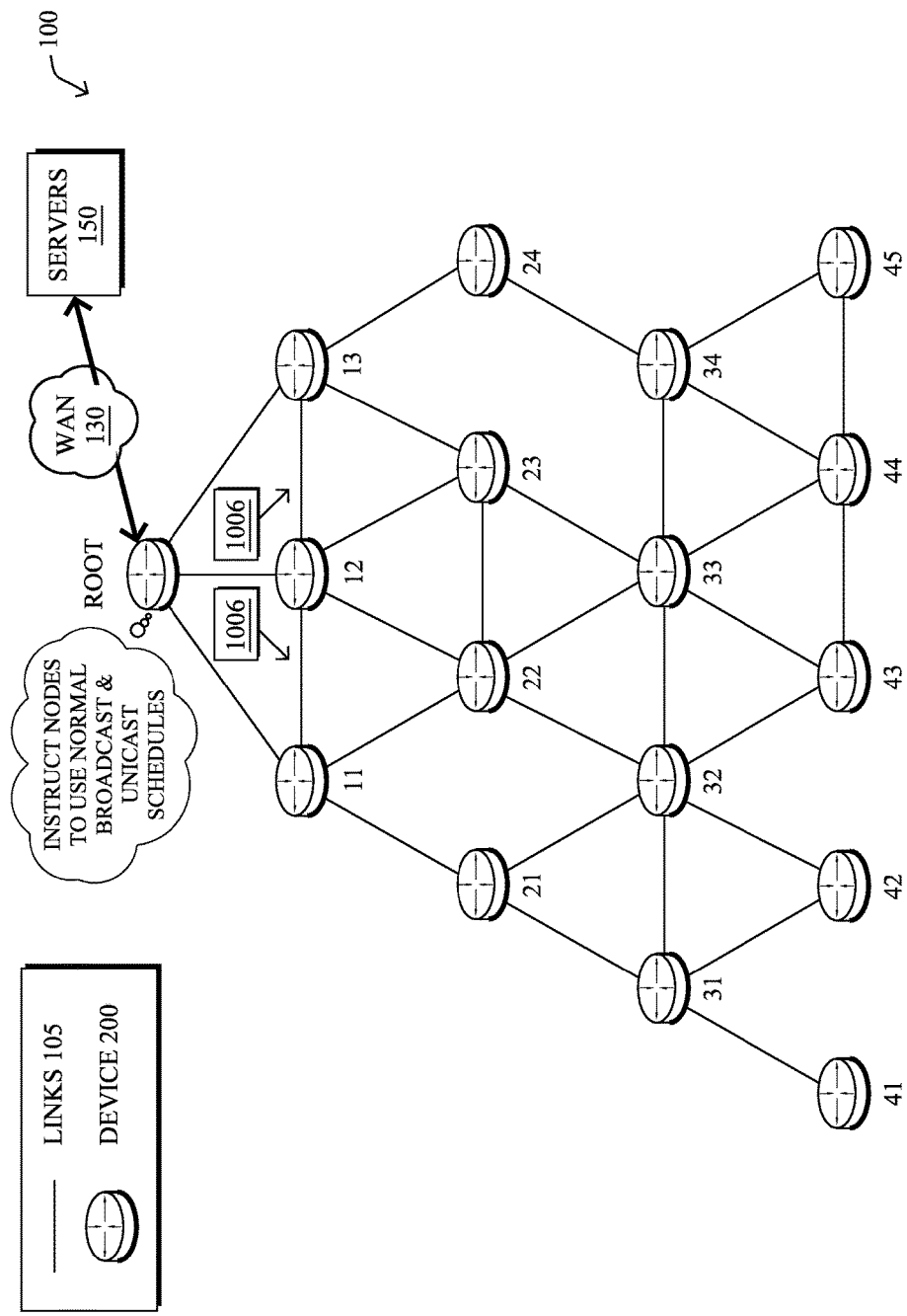

A third aspect of the techniques herein involves disabling the network formation state and returning the nodes to normal operation. For example, as shown in FIG. 10E, the FAR/Root or another supervisory device may determine whether to disable the use of the network formation broadcast schedule and return the node(s) to using a normal broadcast schedule. In particular, the supervisory device may disable the network formation state based on the functionality of the network during or after the network formation event exceeding a performance threshold. For example, as shown in FIG. 10F, the FAR/Root or another supervisory device may send instructions 1006 to one or more nodes in the network that cause the one or more nodes to switch to using their normal broadcast and unicast schedules (e.g., according to the schedules shown in FIG. 8).

The supervisory device may use any number of metrics to determine an appropriate time to disable the network formation state. In one embodiment, the supervisory device may base the decision on the rate of devices joining the network. If for example, the rate of devices joining the network drops below a certain level, the supervisory device may determine that some or all of the functionality of the network has been restored and exceeds the required performance threshold to return the nodes to their normal schedules. In another embodiment, the supervisory device may determine whether or not connectivity to a subset of devices (e.g., critical devices) has been established, thereby providing a baseline degree of functionality in the network. Note that application-layer information may also be used, in some embodiments. For example, when an Outage Management System (OMS) has received enough Power Restoration Notification (PRN) messages to determine whether power has been restored to the service area, the network formation state may be disabled. In other words, the network may leave the network formation state when it is determined that optimizing the communication schedules for fast network formation is no longer needed.

Figure 11A:
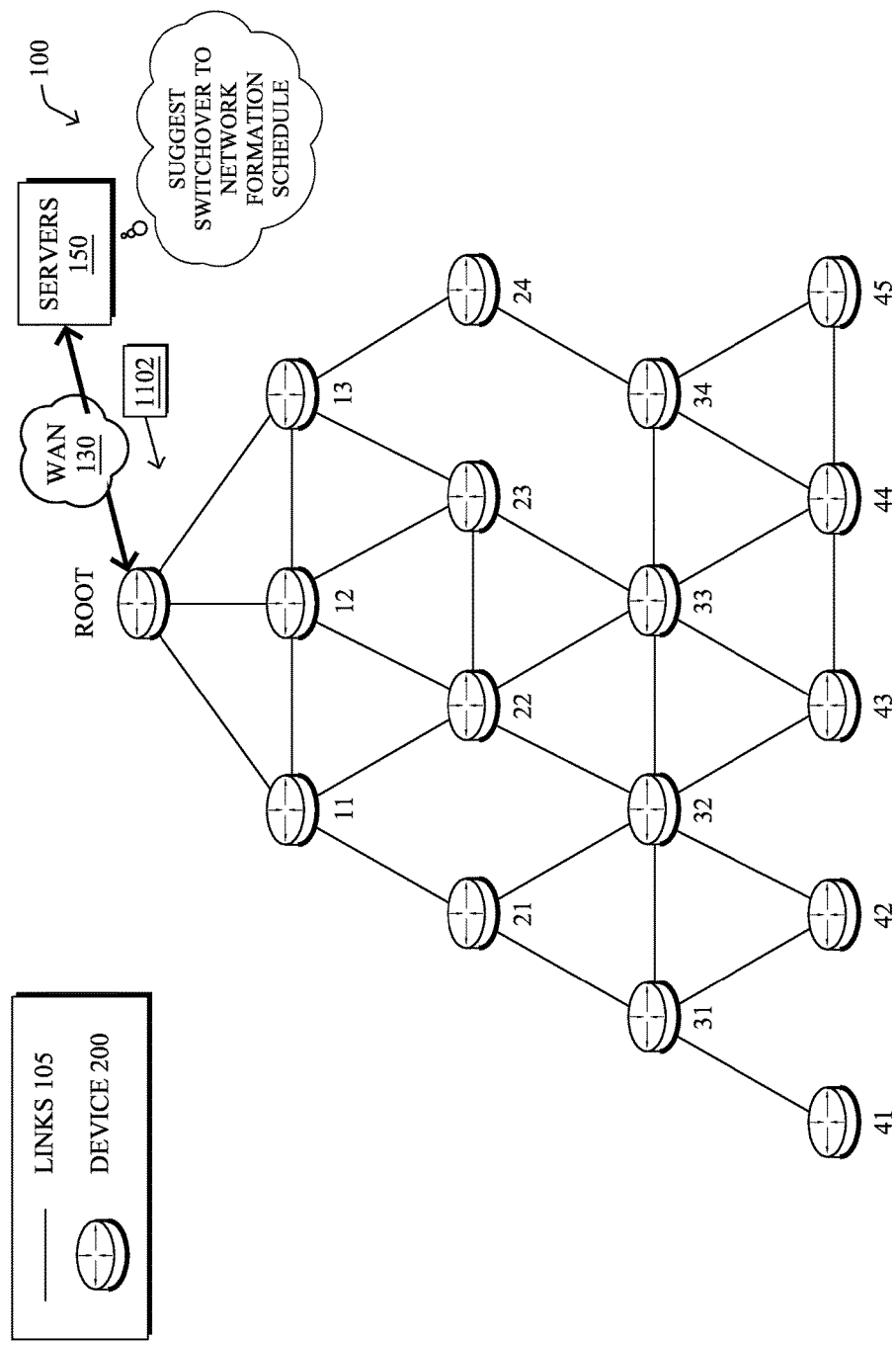
FIGS. 11A-11C illustrate an example of a broadcast schedule switchover being planned.
Figure 11B:
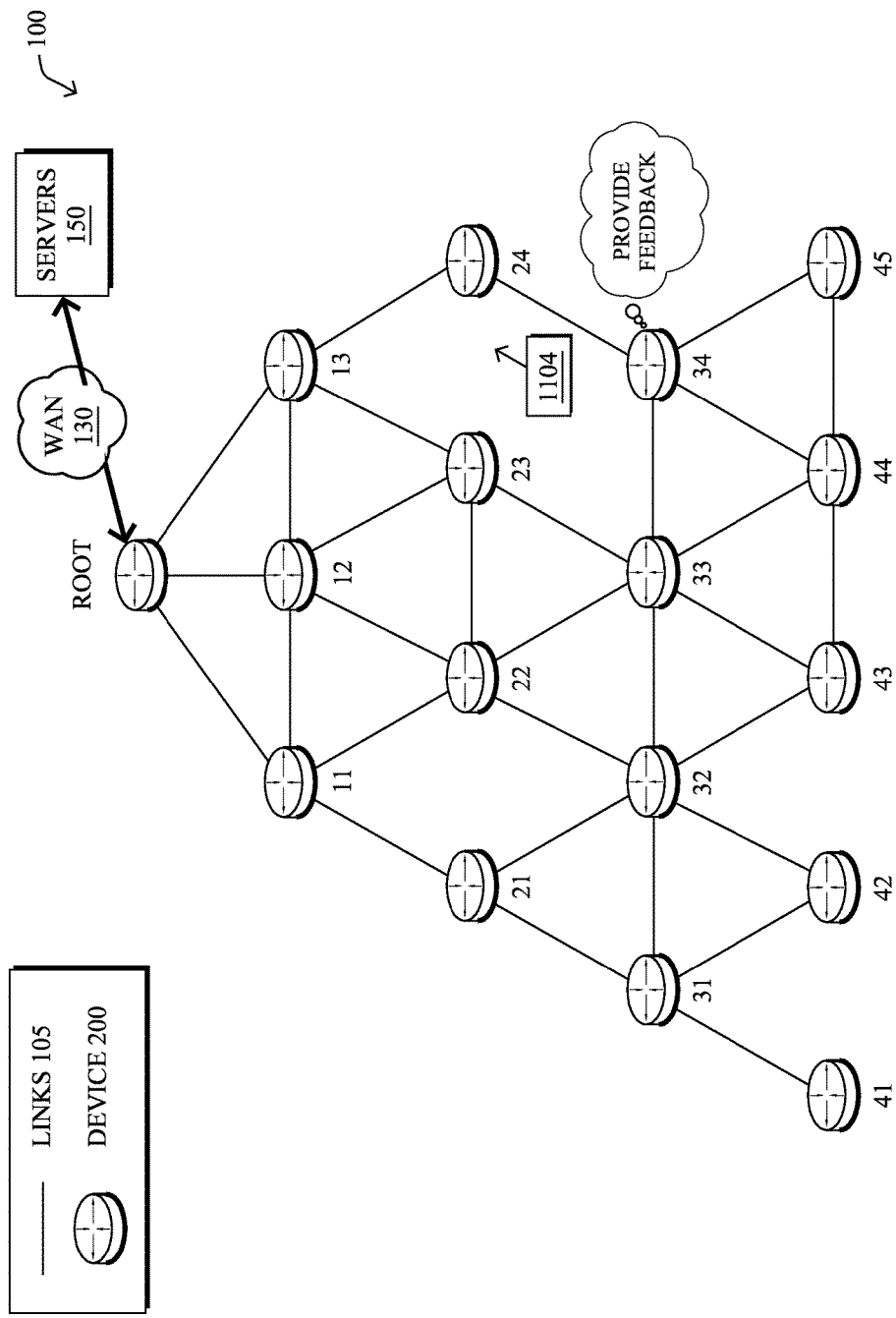
Figure 11C:
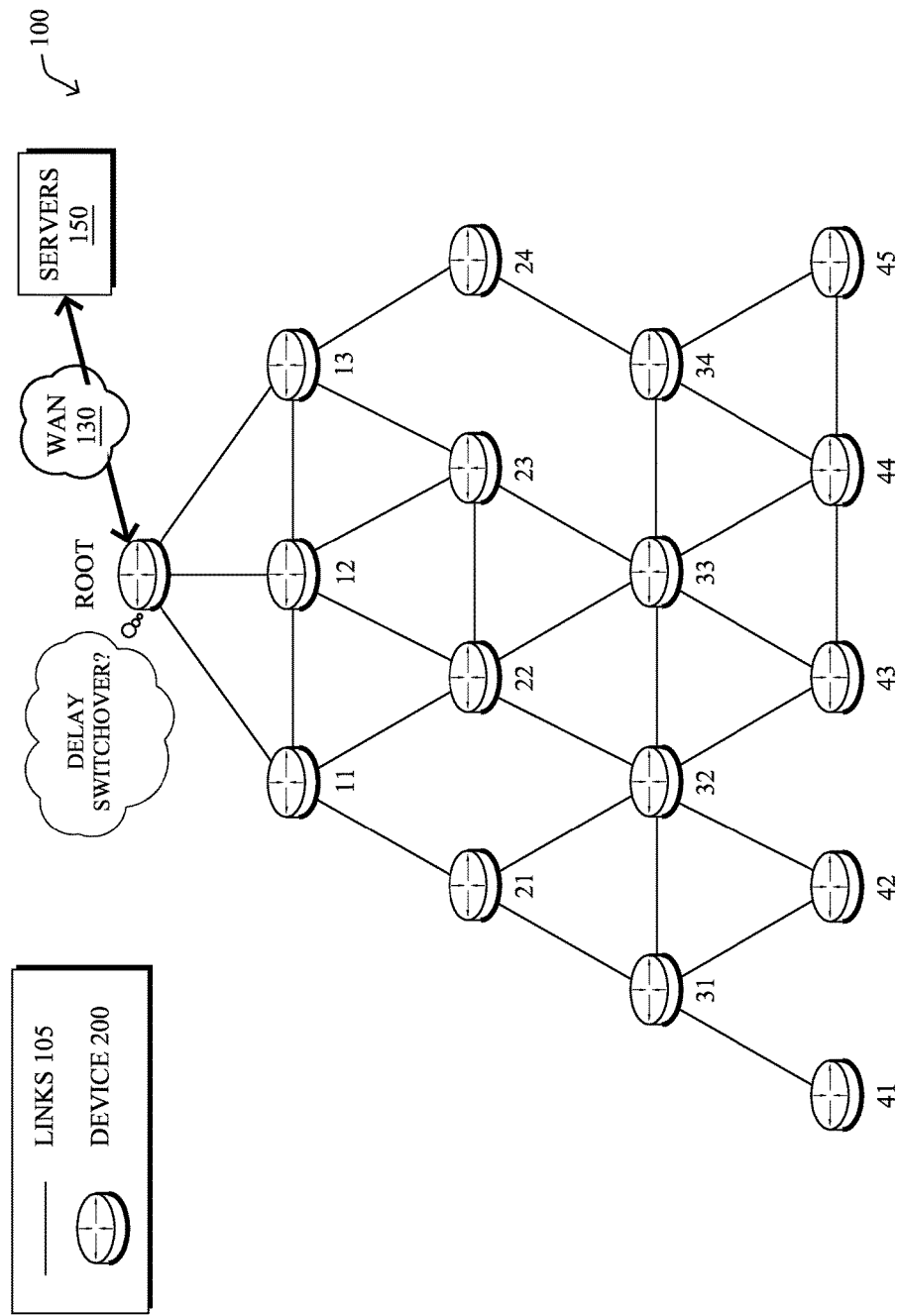

A fourth aspect of the techniques herein involves providing feedback regarding a requested broadcast schedule configuration change. For example, FIGS. 11A-11C illustrate an example of a broadcast schedule switchover being planned using feedback from the network nodes. In various embodiments, two types of messages may be used to indicate that the network should enter the network formation state. In a first mode, the message may be mandatory. In a second mode, the message may be a suggestion (e.g., the FAR may receive a request from the NMS indicating that a software upgrade should take place, etc.). For example, as shown in FIG. 11A, the NMS, OMS, or other supervisory device may send a message 1102 to the FAR/Root node that suggests a changeover to a network formation broadcast schedule. Alternatively, message 1102 may be mandatory in which case the FAR/Root may instruct the one or more nodes to use the network formation broadcast schedule.

When a broadcast switchover is non-mandatory, feedback from the network nodes may be used to determine whether or not to implement the switchover. For example, as shown in FIG. 11B, node 34 may provide feedback 1104 to the FAR/Root node. In general, feedback 1104 may include any information that may be used by the FAR/Root or another supervisory device to determine whether or not to impose a network formation broadcast schedule on the nodes. For example, feedback 1104 may indicate whether or not node 34 has critical traffic to send. In various cases, feedback 1104 may be provided on a push basis (e.g., sent unprompted, etc.) or on a pull basis (e.g., in response to a request from the FAR/Root, etc.).

Based on the feedback received from the nodes, the FAR/Root may take one of several actions, according to a predefined policy. In one case, if the feedback from the nodes is wholly or mostly positive (e.g., the switchover will have minimal impact on critical traffic, etc.), the device may instruct the nodes to use the network formation broadcast schedule during a network formation event. In another case, the device may delay the network formation event for a period of time (e.g., by delaying a software upgrade, etc.). For example, as shown in FIG. 11C, the FAR/Root may determine that a delay is appropriate if 10% or more of the reporting nodes indicate that they have critical traffic to send. In such a case, the FAR/Root may continue to analyze feedback from the nodes until it determines that it is safe to reform the network. Alternatively, if a certain amount of time has passed and the FAR/Root cannot identify an appropriate time, it may notify the NMS, etc. that it cannot determine an appropriate time to initiate the switchover.

Figure 12:
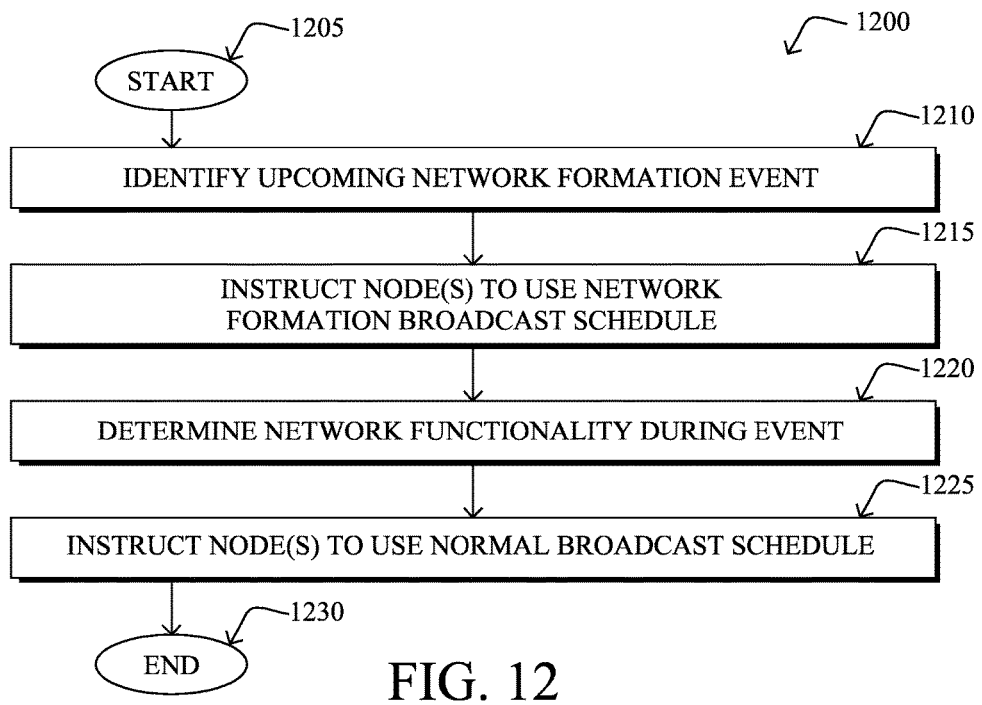
FIG. 12 illustrates an example simplified procedure for adjusting broadcast capacity in a network.

FIG. 12 illustrates an example simplified procedure for adjusting broadcast capacity in a network, in accordance with various embodiments herein. In general, procedure 1200 may be performed by a supervisory device (e.g., a device 200) configured to control the broadcast schedules used by one or more nodes in the network. Procedure 1200 may start at a step 1205 and continue on to step 1210 where, as described in greater detail above, the device identifies an upcoming network formation event. In one embodiment, the network formation event may be a scheduled event. For example, the network may be reformed after a scheduled outage of the FAR/Root of the network (e.g., due to a software upgrade, etc.). In another embodiment, the network formation event may coincide with a detected power outage event in the network. Notably, after power is restored, nodes may attempt to rejoin the network.

In some embodiments, the device may identify the upcoming network formation event via an instruction from another device (e.g., an NMS, etc.). Such an instruction may be mandatory or non-mandatory (e.g., a suggested network outage/formation event, etc.). In the non-mandatory case, the device may use information received from the one or more nodes in the network to determine whether delay the network formation event. For example, if a certain percentage of the nodes are going to send critical traffic, the device may delay the network formation event for some time.

At step 1215, the device instructs one or more nodes in the network to use a network formation broadcast schedule, as described in greater detail above. In various cases, the instruction may indicate that the switchover should happen immediately, that the switchover should occur at a specified time, and/or that the switchover should occur in response to a specific event (e.g., after power is restored to the node, after the node loses connectivity to the network, etc.). In various embodiments, the network formation broadcast schedule may be such that an instructed node is configured to receive and/or transmit data via the common broadcast channels some, if not all, of the time when the network formation broadcast schedule is active.

At step 1220, as detailed above, the device may determine that a degree of network functionality during the network reformation event exceeds a performance threshold, as detailed above. In one embodiment, the device may determine that a certain threshold level of functionality has been restored to the network based on the rate of joining nodes dropping below a certain level. In another embodiment, the device may determine that the level of functionality has been achieved after a certain number, or percentage, of critical nodes have rejoined the network. In a further embodiment, the device may presume that the network functionality exceeds the performance threshold based on an amount of elapsed time (e.g., the device may presume that functionality has been restored after a certain amount of time after the network started forming).

At step 1225, as detailed above, the device instructs the one or more nodes to use a normal broadcast schedule, in response to determining that the network functionality exceeds the performance threshold. In various embodiments, each node may determine its own individual channel hopping schedule for purposes of receiving unicast transmissions. Broadcast schedules may then be overlaid onto the unicast schedules, such that a node uses the broadcast schedule a certain percentage of the time. Under normal circumstances, the broadcast schedule may be kept to a lower percentage (e.g., less than 35%) of the total amount of time. In other words, a defining characteristic of the normal broadcast schedule may be that its channels are active only a fraction of the time. In contrast, the network formation broadcast schedule may be active all of the time or at least a high percentage of the time (e.g., greater than 80% of the time, 100% of the time, etc.). Procedure 1200 then ends at step 1230.

Figure 13:
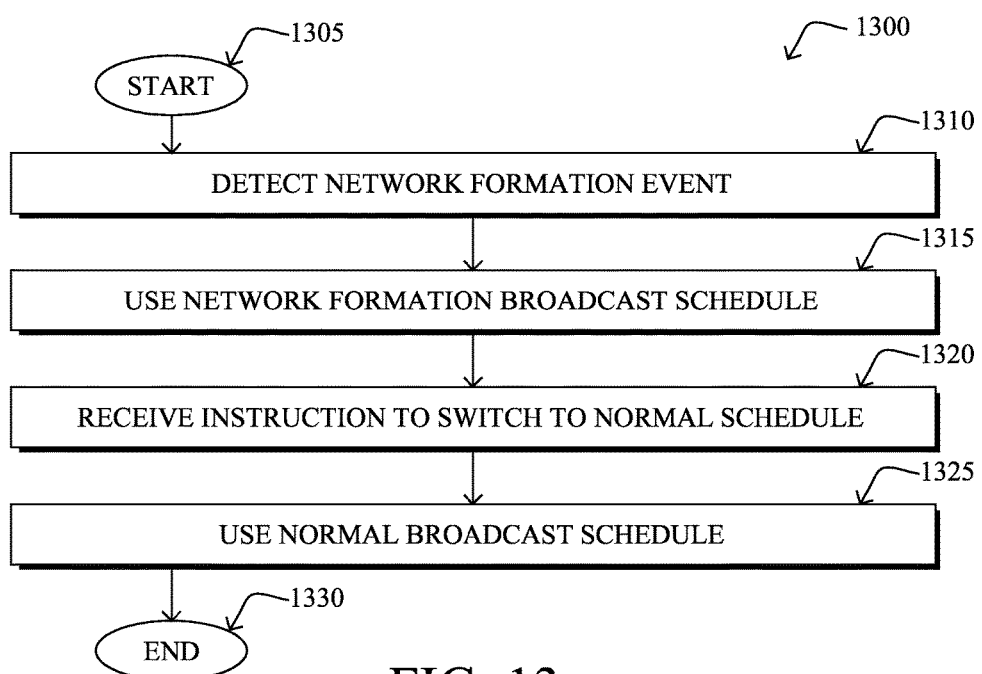
FIG. 13 illustrates an example simplified procedure for changing broadcast schedules.

FIG. 13 illustrates an example simplified procedure for changing broadcast schedules, in accordance with various embodiments herein. Procedure 1300 may be performed by any device (e.g., device 200) configured to use a broadcast schedule in conjunction with a unicast schedule, such as a self-generated unicast schedule. Procedure 1300 begins at step 1305 and continues on to step 1310 where, as described in greater detail above, the device detects a network formation event. For example, the device may determine that a network formation event is occurring based on another device in the network advertising the presence of the network. In other words, the device may determine that a network formation event is occurring whenever the device attempts to join a network.

At step 1315, as detailed above, the device uses a network formation broadcast schedule during the network formation event. In various embodiments, and in contrast to normal network operation, the network formation broadcast schedule may be such that the schedule's channels are active or almost always active at the device, when in use. For example, the device may use the broadcast channels 100% of the time, during the network formation event. Since broadcasts allow for the quicker dissemination of data to neighbors over unicast transmissions, this may speed up the network formation process. In some embodiments, the device may be preconfigured to use the broadcast schedule as part of its commissioning before deployment. In other embodiments, the device may receive an instruction to use the network formation broadcast schedule from a supervisory device (e.g., as part of a planned outage, after a power outage, etc.).

At step, 1320, the device receives an instruction to switch to using a normal broadcast schedule, as detailed above. In general, a normal broadcast schedule refers to a broadcast schedule that is used in the network during normal operation (e.g., after network formation or reformation). Notably, under normal network conditions, the device may overlay a broadcast schedule over its self-determined unicast schedule that occupies only a small percentage of the device's time. For example, the channels of a normal broadcast schedule may only be active 25% of the time when in use, while the device devotes the remaining 75% of its time to using its unicast schedule. In various embodiments, such an instruction may be sent by a supervisory device after the supervisory device that determines that at least a minimum amount of functionality has been restored to the network via the network formation process.

At step 1325, the device begins using the normal broadcast schedule, as described in greater detail above. In particular, the device may switch over from using broadcast channels all the time, or most of the time, to using its unicast schedule for the majority of the time. Procedure 1300 then ends at step 1330.

It should be noted that while certain steps within procedures 1200-1300 may be optional as described above, the steps shown in FIGS. 12-13 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1200-1300 are described separately, certain steps from each procedure may be incorporated into each other procedure, and the procedures are not meant to be mutually exclusive.

As would be appreciated, the techniques herein make an explicit tradeoff between broadcast vs. unicast capacity, when electing to enter a network formation state. Notably, increasing broadcast capacity in a decentralized channel-hopping network actually decreases overall network capacity, since doing so reduces spectral diversity. However, such a tradeoff may be acceptable in certain circumstances, such as when the network is formed or reformed. Also of note is that the techniques herein may be applied to networks in which individual nodes select their own unicast schedules. In such cases, the individual unicast schedules may be completely asynchronous and uncoordinated with the overall broadcast schedule and the unicast schedules of other nodes (e.g., as opposed to implementations that use a coordinated scheduling mechanism, such as 6TiSch).

The techniques described herein, therefore, provide a method for proactively increasing the broadcast schedule capacity when network formation activity is to occur in the near future. Increasing the broadcast schedule capacity allows for much quicker network formation since neighbor discovery can occur more efficiently and removes the channel-hopping dimension from the discovery protocol. By being proactive, no additional time response overhead is incurred to detect the need for additional broadcast capacity.

While there have been shown and described illustrative embodiments that provide for proactively adjusting the broadcast schedule in a network for fast network joins, it is to be understood that various other adaptations and modifications may be made within the spirit and scope of the embodiments herein. For example, the embodiments have been shown and described herein with relation to PLC networks. However, the embodiments in their broader sense are not as limited, and may, in fact, be used with other types of shared-media networks and/or protocols (e.g., wireless). In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   identifying, by a device in a network, an upcoming network formation event;
   in response to identifying an upcoming formation event and prior to the upcoming network formation event occurring:
   instructing, by the device, one or more nodes in the network to use a network formation broadcast schedule during the upcoming network formation event, wherein in the network formation broadcast schedule increases slot periods within the network formation broadcast schedule to accommodate upcoming network join operations for the upcoming network formation event;
   determining, by the device, that a degree of functionality in the network during the upcoming network formation event exceeds a threshold amount, wherein the degree of functionality of the network corresponds to a rate of nodes joining the network during the upcoming network formation event or to a number of critical nodes that have joined the network during the upcoming network formation event; and
   in response to determining that the degree of functionality in the network during the upcoming network formation event exceeds the threshold amount, causing, by the device, the one or more nodes to use a normal broadcast schedule, wherein channels of the network formation broadcast schedule are active more frequently than channels of the normal broadcast schedule when in use.

2. The method as in claim 1, wherein identifying the upcoming network formation event comprises:
   determining, by the device, that a power outage event has occurred in the network.

3. The method as in claim 1, wherein identifying the upcoming network formation event comprises:
   determining, by the device, that a router in the network is going to be rebooted.

4. The method as in claim 1, wherein the one or more devices self-generate unicast schedules, and wherein the normal and network formation broadcast schedules are overlaid on the unicast schedules.

5. The method as in claim 1, wherein the channels of the network formation broadcast schedule are active at least 80% of the time, and wherein the channels of the normal broadcast schedule are active less than 35% of the time.

6. The method as in claim 1, wherein the device instructs the one or more nodes in the network to use the network formation broadcast schedule during the upcoming network formation event, in response to receiving a mandatory instruction to adjust broadcast schedules.

7. The method as in claim 1, further comprising:
   receiving, at the device, a non-mandatory request to switch the one or more nodes to the network formation broadcast schedule; and determining, by the device, whether to instruct the one or more nodes to use the network formation broadcast schedule.

8. The method as in claim 7, further comprising:
determining, by the device, not to instruct a particular node to use the network formation broadcast schedule based on feedback received from the particular node.

9. The method as in claim 1, further comprising:
delaying, by the device, the upcoming network formation event.

10. A method, comprising:
detecting, by a device, a network formation event;
in response to detecting the network formation event and prior to the network formation event occurring, using, by the device, a network formation broadcast schedule during the network formation, wherein in the network formation broadcast schedule increases slot periods within the network formation broadcast schedule to accommodate upcoming network join operations for the network formation event;
receiving, at the device, an instruction to switch to a normal broadcast schedule; and
using, by the device, the normal broadcast schedule, in response to receiving the instruction, wherein channels of the network formation broadcast schedule are active more frequently than channels of the normal broadcast schedule when in use, and wherein the normal broadcast schedule is used in response to a determination that a degree of functionality in the network during the network formation event exceeds a threshold amount, and the degree of functionality of the network corresponds to a rate of nodes joining the network during the network formation event or to a number of critical nodes that have joined the network during the network formation event.

11. The method as in claim 10, further comprising:
generating, by the device, an individual unicast schedule; and
overlaying, by the device, the normal and network formation broadcast schedules over the generated individual unicast schedule.

12. The method as in claim 10, wherein the channels of the network formation broadcast schedule are active at least 80% of the time, and wherein the channels of the normal broadcast schedule are active less than 35% of the time.

13. The method as in claim 10, further comprising:
receiving, at the device, an instruction to use the network formation broadcast schedule.

14. An apparatus, comprising:
one or more network interfaces to communicate with a network;
a processor coupled to the one or more network interfaces and configured to execute a process; and
a memory configured to store the process executable by the processor, the process when executed operable to:
identify an upcoming network formation event;
in response to identifying an upcoming formation event and prior to the upcoming network formation event occurring:
instruct one or more nodes in the network to use a network formation broadcast schedule during the upcoming network formation event, wherein in the network formation broadcast schedule increases slot periods within the network formation broadcast schedule to accommodate upcoming network join operations for the upcoming network formation event;
determine that a degree of functionality in the network during the upcoming network formation event exceeds a threshold amount, wherein the degree of functionality of the network corresponds to a rate of nodes joining the network during the upcoming network formation event or to a number of critical nodes that have joined the network during the upcoming network formation event; and
instruct the one or more nodes to use a normal broadcast schedule, in response to determining that the degree of functionality in the network during the upcoming network formation event exceeds the threshold amount, wherein channels of the network formation broadcast schedule are active more frequently than channels of the normal broadcast schedule when in use.

15. The apparatus as in claim 14, wherein the upcoming network formation event is identified by:
determining that a power outage event has occurred in the network.

16. The apparatus as in claim 14, wherein the upcoming network formation event is identified by:
determining that a router in the network is going to be rebooted.

17. The apparatus as in claim 14, wherein the one or more devices self-generate unicast schedules, and wherein the normal and network formation broadcast schedules are overlaid on the unicast schedules.

18. The apparatus as in claim 14, wherein the channels of the network formation broadcast schedule are active at least 80% of the time, and wherein the channels of the normal broadcast schedule are active less than 35% of the time.

19. The apparatus as in claim 14, wherein the device instructs the one or more nodes in the network to use the network formation broadcast schedule during the upcoming network formation event, in response to receiving a mandatory instruction to adjust broadcast schedules.

20. The apparatus as in claim 14, wherein the process when executed is further operable to:
receive a non-mandatory request to switch the one or more nodes to the network formation broadcast schedule; and
determine whether to instruct the one or more nodes to use the network formation broadcast schedule.

21. The apparatus as in claim 14, wherein the process when executed is further operable to:
determine not to instruct a particular node to use the network formation broadcast schedule based on feedback received from the particular node.

22. The apparatus as in claim 14, wherein the process when executed is further operable to:
delay the upcoming network formation event.

23. An apparatus, comprising:
one or more network interfaces to communicate with a network;
a processor coupled to the one or more network interfaces and configured to execute a process; and
a memory configured to store the process executable by the processor, the process when executed operable to:
detect a network formation event;
in response to detecting an network formation event and prior to the network formation event occurring:
use a network formation broadcast schedule during the network formation event, wherein in the network formation broadcast schedule increases slot periods within the network formation broadcast schedule to accommodate upcoming network join operations for the network formation event;

receive an instruction to switch to a normal broadcast schedule; and use the normal broadcast schedule, in response to receiving the instruction, wherein channels of the network formation broadcast schedule are active more frequently than channels of the normal broadcast schedule when in use, and wherein the normal broadcast schedule is used in response to a determination that a degree of functionality in the network during the network formation event exceeds a threshold amount, and the degree of functionality of the network corresponds to a rate of nodes joining the network during the network formation event or to a number of critical nodes that have joined the network during the network formation event.

24. The apparatus as in claim 23, wherein the process when executed is further operable to:

generate an individual unicast schedule; and overlay the normal and network formation broadcast schedules over the generated individual unicast schedule.

25. The apparatus as in claim 23, wherein the channels of the network formation broadcast schedule are active at least 80% of the time, and wherein the channels of the normal broadcast schedule are active less than 35% of the time.

26. The apparatus as in claim 23, wherein the process when executed is further operable to:

receive an instruction to use the network formation broadcast schedule.

* * * * *